United States Patent [19]
Van Durrett et al.

[11] Patent Number: 5,501,571
[45] Date of Patent: Mar. 26, 1996

[54] AUTOMATED PALLETIZING SYSTEM

[75] Inventors: William Van Durrett; Gerald W. Hieronymus; Marguerite A. Pond; Todd D. Price; Margaret L. S. Scurry, all of Charlotte; William C. Steene, Gastonia, all of N.C.

[73] Assignee: International Business Machines Corporation, Armonk, N.Y.

[21] Appl. No.: 7,646

[22] Filed: Jan. 21, 1993

[51] Int. Cl.$^6$ .................................... B65G 57/26
[52] U.S. Cl. .................. 414/786; 364/478; 414/21; 414/902
[58] Field of Search ............... 364/478; 414/21, 414/902, 934, 786

[56] References Cited

U.S. PATENT DOCUMENTS

| | | | |
|---|---|---|---|
| 3,436,968 | 4/1969 | Unger et al. | 414/934 X |
| 4,181,947 | 1/1980 | Krauss et al. | 364/478 |
| 4,239,434 | 12/1980 | Gannon | 364/478 X |
| 4,641,271 | 2/1987 | Konishi et al. | 364/478 |
| 4,692,876 | 9/1987 | Tenma et al. | 364/478 X |
| 4,746,255 | 5/1988 | Roccabianca et al. | 294/67.33 X |
| 4,786,229 | 11/1988 | Henderson | 414/786 |
| 5,175,692 | 12/1992 | Mazouz et al. | 414/902 X |
| 5,203,671 | 4/1993 | Cawley et al. | 414/902 X |

OTHER PUBLICATIONS

"An Expert System Approach to Palletizing Unequal–Sized Containers" SPIE Application of Artifical Intelligence, Mar. 1989 By Gilmore et al.

"Palletizing Unequal–Sized Containers", Proceedings of SPIE, Mar. 1989, pp. IS I 1–10 By Gilmore et al.

*Primary Examiner*—Michael S. Huppert
*Assistant Examiner*—Janice L. Krizek
*Attorney, Agent, or Firm*—Homer L. Knearl; Karl O. Hesse; Kenneth A. Seaman

[57] ABSTRACT

An automatic palletizer system loads a random set of different size and weight boxes onto a pallet without a prior knowledge of the boxes to be loaded. As the boxes pass along a conveyor belt on the way to the pallet, a weighing, dimensioning, and scanning station determines the weight, dimensions and contents of each box. A processor uses this information to continuously remap the optimal pallet configuration for the loading of the remaining boxes as the pallet is loaded. A queuing station, under direction of the processor, reshuffles the sequence of a limited number of boxes to improve the final pallet configuration. The pallet is loaded by a robot arm under direction of the processor.

12 Claims, 20 Drawing Sheets

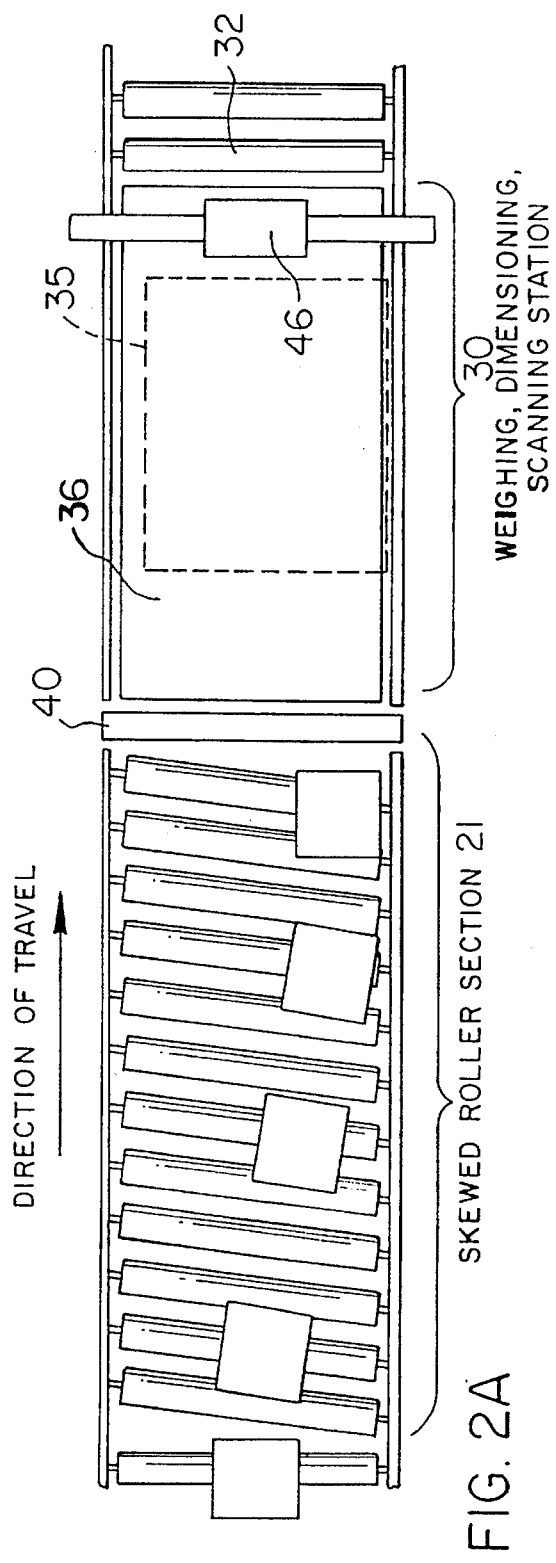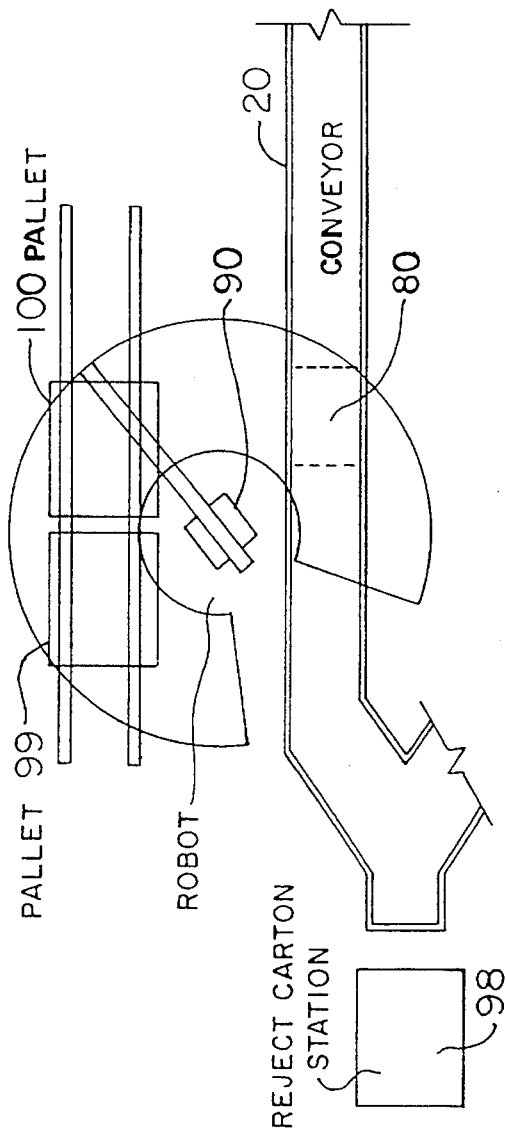

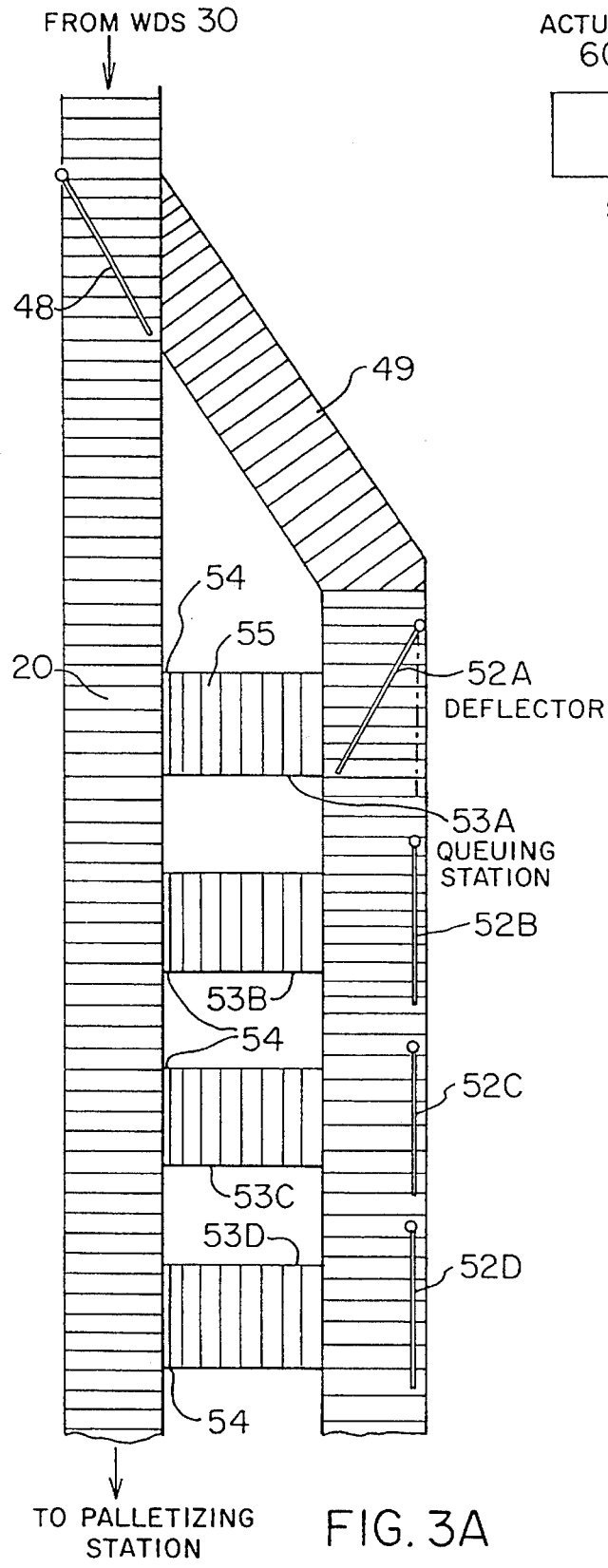
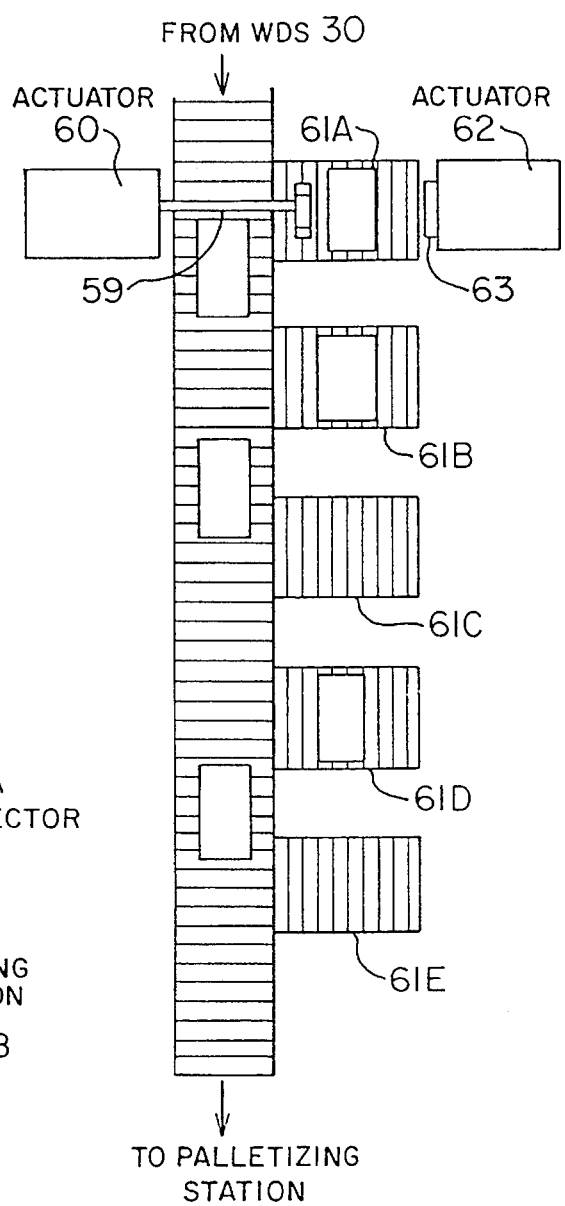
FIG. 3A
FIG. 3B

AUTOMATED PALLETIZING SYSTEM

BACKGROUND OF THE INVENTION

1. Field of the Invention

This invention relates to apparatus and methods for automatically loading on a pallet a random set of different size and weight boxes. More particularly, this invention relates to automated palletizing without a prior knowledge of the boxes to be loaded.

2. Description of the Prior Art

Manual loading of boxes, or shipping cartons, onto a pallet entails high labor costs and high possibility of injuries. In addition, it is difficult to load a random set of different size and weight boxes so the resulting pallet is stable.

Early attempts at palletizing boxes automatically could only handle boxes which were all the same size. Henderson U.S. Pat. No. 4,786,229 is an example of this sort of system.

More recently, attempts have been made to load unequal size and weight boxes by automated palletizing. These inventions fall into two categories. The first type utilizes an operator who has knowledge of the size and weight of all of the boxes to be loaded. The operator designates to a computer the location of each box on the pallet, for example with the aid of a graphic terminal. The computer then determines the optimum loading sequence, and a marshalling device puts the boxes in that order. The boxes are then loaded on the pallet by a robot arm controlled by the computer. Examples include Konishi et al. U.S. Pat. No. 4,641,271, Tenma et al. U.S. Pat. No. 4,692,876, and Roccabianca et al. U.S. Pat. No. 4,746,255. These inventions require a prior knowledge of all of the boxes to be palletized. Also, an operator must still determine the pallet configuration. Thus, the process is slow, and the configuration is optimized for stability only to the extent permitted by human error.

In the last few years, work has been done on a second type of palletizing device, which uses an expert system to determine the pallet configuration. See, for example, "An Expert System Approach to Palletizing Unequal-sized Containers," Gilmore et al., *SPIE Application of Artificial Intelligence*, March 1989, and "Palletizing Unequal-Sized Containers," Gilmore et al. *Proceedings of SPIE*, March 1989. Gilmore has modelled a system which can automatically determine pallet configuration for different sizes and weights of boxes without operator assistance if the system has a prior knowledge of the size and weight of every box in the entire pallet load.

The need remains in the art for an automated palletizing system that can operate "on the fly", continually remapping optimal loading configuration as the pallet is being loaded, and based on what remaining boxes randomly appear on the line to be loaded on the pallet.

SUMMARY OF THE INVENTION

An object of the present invention is to provide a system which is capable of automatically determining the optimal loading configuration of a pallet, on the fly, without a prior knowledge of the boxes to loaded.

In order to accomplish this object, the configuration of boxes on a pallet is repeatedly remapped as boxes are fed on a conveyor to a robot arm that loads boxes from the conveyor to the pallet. A scanner is provided on the conveyor; the scanner determines the size and weight of each box as it moves along the conveyor. A processor uses this information to continuously remap the optimal pallet configuration for boxes remaining to be loaded on the pallet. A queuing module, under the direction of the processor, queues the sequence of boxes on the conveyor in proper pallet loading sequence for the optimal pallet configuration. The robot arm loads the pallet as directed by the processor.

The queuing module accomplishes the queuing of the boxes by pulling a limited number of boxes off the conveyor and holding them until the processor directs each one to be returned to the conveyor, when appropriate, for optimal pallet loading. The robot arm loading station includes the capability of loading boxes to a second pallet when too many heavy boxes arrive too close together on the conveyor to be accommodated by the current pallet.

The processor accomplishes the continuous remapping of the optimal loading by utilizing an expert system. The expert system follows a process so as to load heavier boxes on the bottom and lighter boxes on the top, and builds the pallet in layers rather than columns, when possible, for increased stability.

As boxes for a particular order begin arriving at the palletizing station, the system begins building a new pallet. This is done by building heavy layers of boxes until half of the maximum height of the pallet is reached. Then, light layers are built until the maximum height or weight of the pallet is reached. If during the process of building heavy layers too many light boxes arrive to be stored in the queue, a column of light boxes is built.

If there are more boxes to be loaded after the pallet is completely loaded, the loading of a new pallet is started. In addition, if boxes in a customer order are missing, an exception report is printed showing boxes that were expected in the order but never arrived at the palletizing station. An invoice of each pallet is also printed after the pallet is loaded.

The layer building process begins by determining the characteristics of the boxes available in the queue or on the conveyor to build the layer. Then, each of several known partition plans is selected, and a layer is planned according to this partition plan. A partition plan is a method of breaking the pallet up into two sections and mapping boxes onto each section. After all of the partition plans are tried, the best plan in terms of cube efficiency, levelness, weight distribution, etc., is selected. This plan is used to begin placing boxes but as each new box appears on the conveyor, each partition plan is retried to determine whether it is now more optimal. Boxes which have already been placed on the pallet are not moved. They are included in each remapped partition plan.

The general strategy of building layers is as follows. If there are enough boxes of one kind available, a uniform layer is built. If there are enough boxes of one kind for two such layers, the orientation of the second is changed from the orientation of the first for stability. If enough boxes of the same type are not available, then the layer is built attempting to place heavier boxes on corners and taller and heavier boxes on edges. Remaining boxes are used to fill in the middle of the layer.

If column building is required, the process begins by finding space for the column as far back on the pallet as possible, so that the robot arm does not have to reach over the column to load the pallet. The column is actually a wall of boxes covering the entire width of the pallet. Once space is selected, the process checks to see if enough boxes of a single type are available. If so, the column is built using these boxes. The column (i.e., wall) is built so that the boxes on the edge of the wall line up with the pallet edges, and the boxes in the middle have an equivalent amount of space between them. The edges are placed first, and then the middle is built. If more than one wall is built, the system alternates between building heavy walls and light walls to distribute the weight on the pallet.

As a feature of the present invention, the scanner includes a bar code reader which can read a label indicating the contents of each box. The processor then takes the contents into account in loading, putting chemicals on the bottom and food on the top, for example. Further, this invention also creates a listing of all of the contents of the pallet by section, and prints it out on an attached printer to send with the pallet.

As another feature, a reject carton station is provided for cartons which are damaged, or too heavy, small or large to be loaded on the pallet by the robot. Damage detection is accomplished at several points. The processor compares the expected size of the carton determined from the bar code label with the actual size determined by the weighing and dimensioning station. The robot station compares the force being exerted by the robot arm on the carton to the amount of force which should be experienced at that point given knowledge of the box dimensions. A vacuum test is also applied to the top of boxes at the robot station to detect open or damaged boxes. Damaged boxes are diverted by passing the boxes via the conveyor through the robot station to the reject carton station to be handled separately. Also diverted to the reject carton station are any boxes which are too large, heavy or small for the robot arm to load.

Other objects, advantages and features of the invention will be understood by those of ordinary skill in the art after referring to the complete written description of the preferred embodiments in conjunction with the following drawings.

BRIEF DESCRIPTION OF THE DRAWINGS

FIG. 2A is a top view of the weighing, dimensioning, scanning (WDS) station.

FIG. 3A is a top view of one embodiment for the queuing module.

FIG. 3B is a top view of an alternate embodiment for the queuing module.

FIG. 4 is a top view of the robot arm loading station.

DETAILED DESCRIPTION OF THE PREFERRED EMBODIMENTS

Figure 1A:
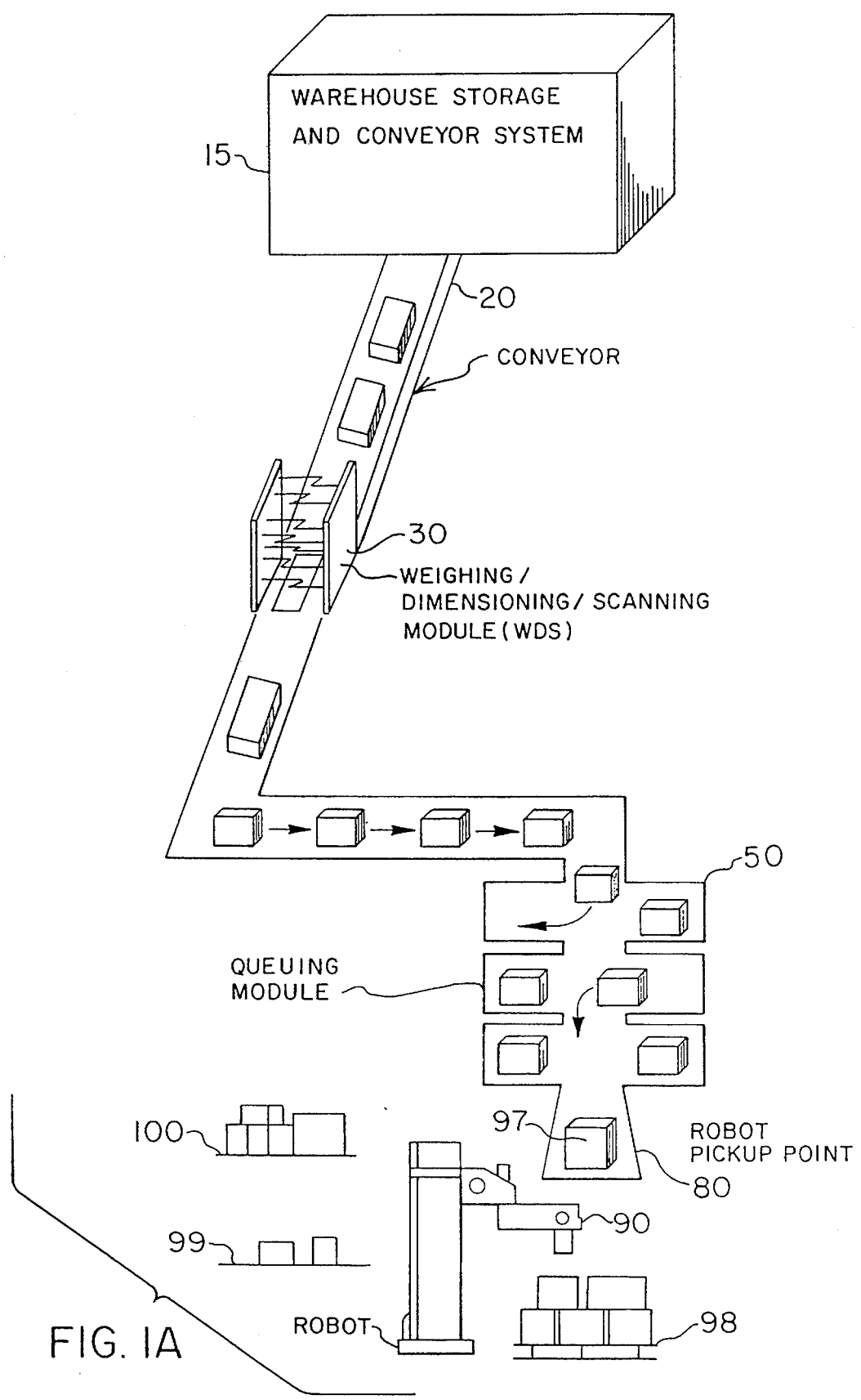
FIG. 1A is a system diagram illustrating the mechanical interaction of elements in the preferred embodiment of the invention.
Figure 1B:
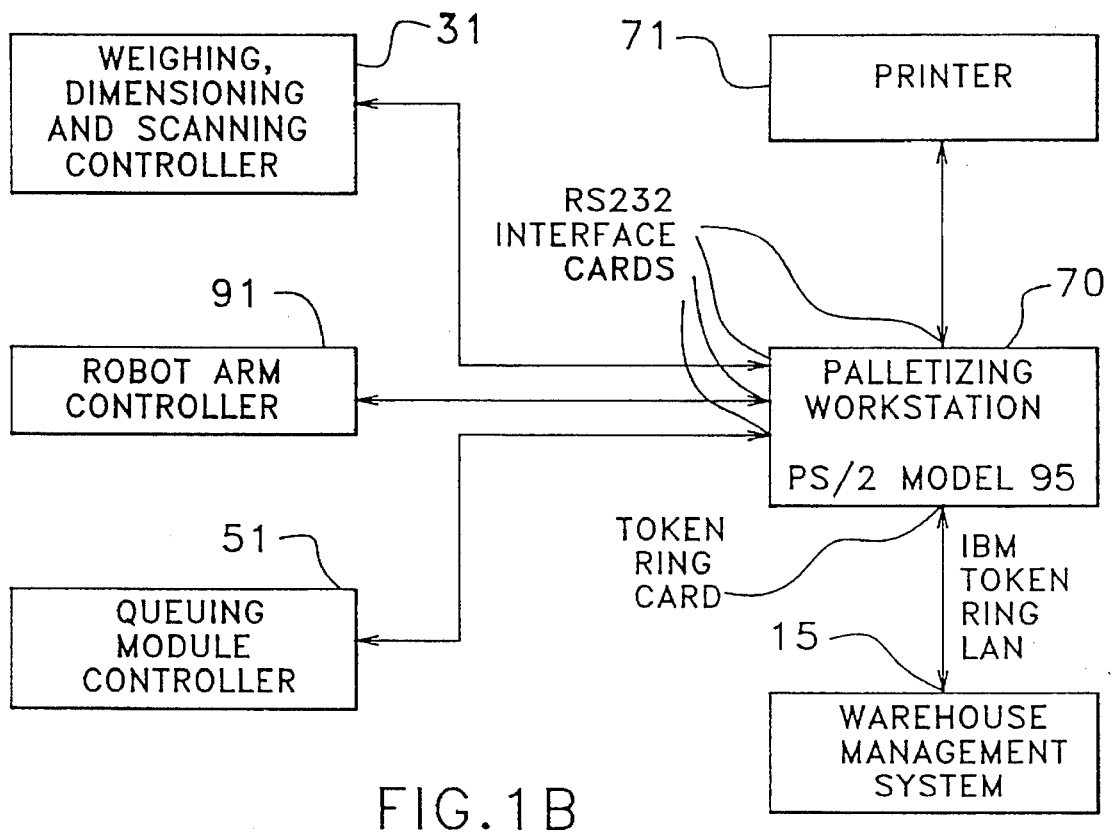
FIG. 1B is a system diagram illustrating the electrical interaction of elements in the preferred embodiment of the invention.

FIG. 1A shows the overall mechanical interaction and operation of the preferred embodiment of the palletizing system. FIG. 1B is a diagram of the electrical system of the preferred embodiment of the present invention. Cartons are delivered to a conveyor 20 by a conventional warehouse storage and conveyor system 15 in a random order. Conveyor 20 passes cartons through weighing, dimensioning and scanning module (WDS) 30. WDS 30 weighs each box, determines its dimensions, and scans its bar code for contents. This information is sent to the processor 70 (FIG. 1B) so that it can begin determining the pallet configuration. Processor 70 instructs queuing module 50 to pull certain ones of the boxes off the conveyor and, subsequently, to return each box to the conveyor 20 in loading sequence so that the boxes are queued in proper pallet loading sequence.

After the WDS 30 identifies each box coming down the conveyor 20, the processor 70 keeps track of the order of the boxes on the conveyor 20 prior to reaching the queueing module 50. As the boxes approach queuing module 50, the processor 70 gives instructions (based on the current pallet build status) to the queuing module controller 51 as to whether the next box is to be held in one of queuing stations 61A–61E. The queuing module controller keeps track of which box is in each queuing station 61. When the processor 70 calls for a particular box, the queuing module controller 51 knows which queuing station 61 the box resides in, and releases it onto conveyor 20.

Next, the queued boxes come to the robot loading area where one of three things can happen. The box may be loaded by robot arm 90 onto pallet 100. If there are too many heavy boxes for pallet 100, robot arm 90 may load the boxes onto an alternate pallet 99. If the box is damaged, or too heavy, small or big, it may be passed to the reject carton station 98.

In FIG. 1B, processor 70 communicates via standard RS-232 communication protocol to the WDS controller 31, the robot controller 91, printer 71, and queuing module controller 51. The hardware required to make up the WDS 30, the robot controller 91, the printer 71 and the queuing module 50 is all commercially available. For example, palletizing robots are built by GMF Robotics of Auburn Hills, Mich., AEG Westinghouse of Pittsburgh, Pa., and Cincinnati Milacron of Greenwood, S.C. Dimensioning and weighing stations are built by AccuSort Systems of Telford, Pa., Quantronix, Inc. of Farmington, Utah, and Toledo Scale Co. of Westerville, Ohio. Bar code readers are built by AccuSort Systems of Telford, Pa. Conveyors and apparatus for queuing modules are built by RAPISTAN Corp. of Grand Rapids, Mich., and AccuSort Systems of Telford, Pa. The command protocol to these modules are determined by what the hardware vendor specifications require.

In the preferred embodiment, processor 70 is an IBM PS/2 Model 95. Three RS-232 adapter cards in the Model 95 connect the processor 70 to the WDS controller 31, robot arm controller 91 and queuing module controller 51. In addition, a token ring adapter card in processor 70 connects the PS/2 Model 95 with the Warehouse Management System 15 via an IBM token ring local area network.

Processor 70 receives data about box weight, size, and contents from WDS 30 through controller 31. WDS controller 31 also tells the processor 70 when it finds a box which is too heavy or big or small to be loaded by the robot arm. As processor 70 determines the loading sequence, it commands the queuing module 50 via controller 51 to remove boxes from conveyor 20 and return them to conveyor 20 as required for optimal loading configuration on the pallet. Processor 70 also commands robot arm controller 91 to load box 97 at the robot pick up point 80 (FIG. 1A) to the current pallet 100, or to the alternate pallet 99 or commands the conveyor to pass the rejected carton to the reject carton station 98. Reject carton station 98 is for faulty or hard-to-load boxes. The robot arm 90 senses faulty boxes, or hard to load boxes, and robot controller 91 tells processor 70 when such a box has been found. Processor 70 commands printer 71 to print an exception list (a list of cartons that were palletized but not listed in the order file, or were listed in the order file but not palletized) and a list for each loaded pallet when pallet loading is complete.

Figure 2B:
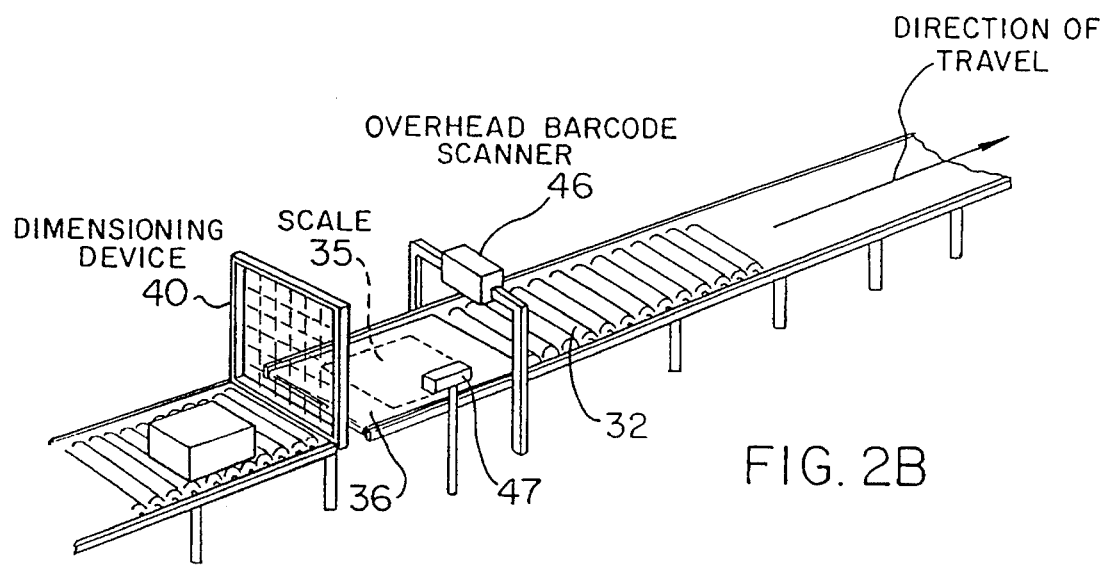
FIG. 2B is a perspective view of the WDS station.

FIGS. 2A and 2B show the Weighing Dimensioning Scanning module (WDS) 30. A skewed roller section 21 directs the boxes to one side of conveyor 20, thus aligning the boxes for the operations of WDS 30. The weighing station has a weighing scale 35 under belt 36 which measures the weight of each box as it is passes over scale 35. The dimensioning device 40 is an LED light curtain made of horizontal and vertical linear arrays of LEDs and photodetectors. Dimensioning device 40 measures width and height by detecting which LED beams are broken in the horizontal and vertical arrays. LEDs 41 and detectors 42, detect the height, and LEDs 43 mounted at the bottom of dimensioning device 40 and detectors 44 mounted at the top detect the width. Since the speed of belt 36 is known, the length of the carton is determined by measuring the length of time the light curtain is broken as the box passes through the light curtain.

Figure 2C:
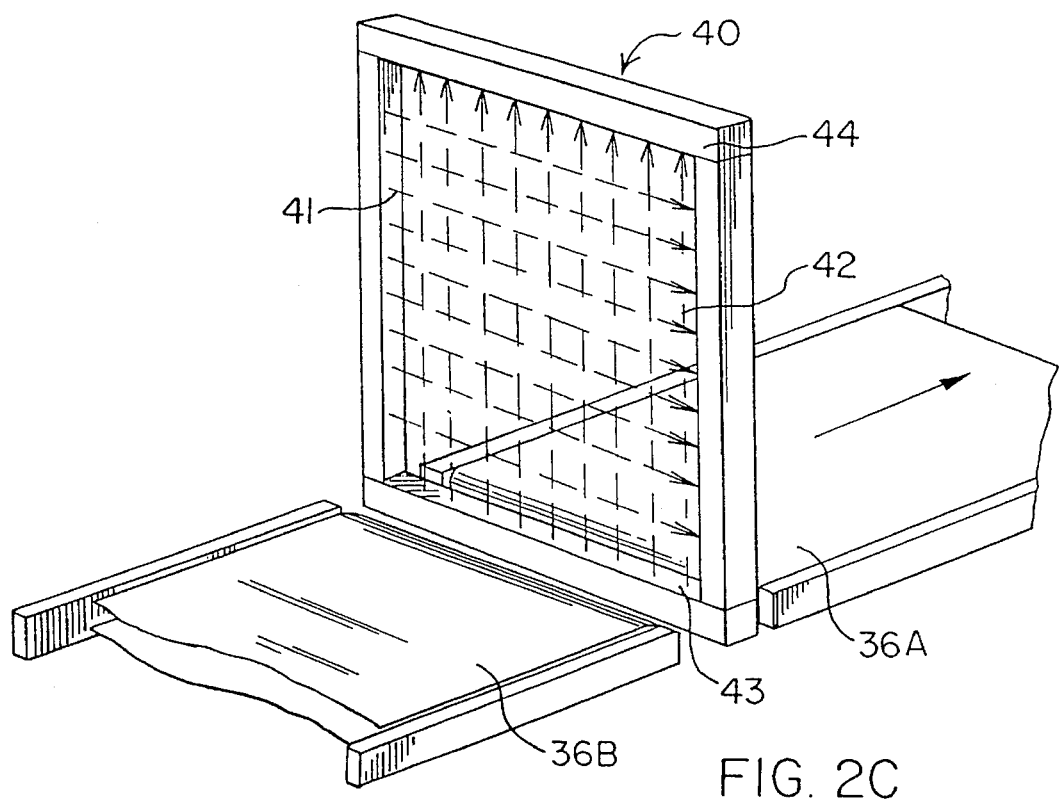
FIG. 2C is a perspective view of the light curtain dimensioning device in the WDS station with belt drive.

FIG. 2C is an alternative embodiment for driving the boxes through the light curtain dimensioning device 40. In FIG. 2C, the boxes are on belt conveyor 36B prior to the curtain and belt conveyor 36A after the curtain. Belts 36A and 36B, moving at the same speed, insure a uniform box speed through the curtain.

The scanning portion of WDS 30 uses a bar code scanner 46 or scanner 47. The scanners will read the bar code affixed either to the top or side of the box. WDS 30, via controller 31, sends the weight, dimensions, and any information determined from the bar code (typically, box identification and contents) to the processor 70. Processing system 70 has stored within it a table to correlate the bar codes read by the scanner with the contents, and expected weight and dimensions of the boxes.

FIGS. 3A and 3B show alternative implementations for queuing module 50. In FIG. 3A, deflector 48 and queue conveyor 49 diverts boxes from the main conveyor 20 on command from the processor 70 via controller 51 (FIG. 1B). In FIG. 3B, a push arm 59 in electromagnetic actuator 60 shoves the box onto queuing station 61 as controlled by controller 51. In FIG. 3A, the actuator is not shown. The deflector arms 48, 52A, 52B, 52C, and 52D may be rotated by rotating the shaft on which the deflector arms are attached, or by a solenoid and linear armature attached to back of the deflector arms. When deflector arms 48 and 52A are in the actuated position shown in FIG. 3A, a box on conveyor 20 is guided onto conveyor 49 and into queuing station 53A. Another alternative (not shown) for diverting a box to a queuing station is a roller transport with a pop up chain. All of these devices are commonly used in conveyor technology.

Gate 54 in each of the queuing stations 53A-53D stops the box from returning to conveyor 20. Gate 54 is simply a bar, or blade, which may be solenoid actuated to block movement of the box. Each gate is controlled by processor 70 via controller 51 (FIG. 1B). On command from the processor, the queuing module 50 returns a box from one of the queuing stations 53A-53D to conveyor 20. When a box is to be returned to conveyor 20, gate 54 is retracted, and motorized rollers 55 in the selected queuing station move the box onto conveyor 20.

In the queuing module of FIG. 3B, push arm 59 driven by actuator 60 shoves the carton off conveyor 20 into a queuing station 61A on command from the processor 70. When processor 70 via controller 51 commands the return of a carton from the queuing station 61, the carton is pushed onto conveyor 20 via another push arm 63 driven by actuator 62. Queuing stations 61B-61E operate in the same manner as queuing station 61A though the push arms and actuators are not shown. As discussed in the description of FIG. 3A, other carton driving means could be used in place of push arms.

The queuing module controller 51 senses a carton entering the queuing module with an LED/photodetector sensor (not shown) located at the module entrance. From that point, the position of the box may be calculated by queuing module controller 51 from the velocity of the conveyor. When the box has reached a position adjacent to a particular queuing station, the push arm or diverter is actuated. For ease of control, other sensors may be added to the queuing module to sense box position at each queuing station. Sensors may also be placed in the queuing station itself to detect the presence of a carton.

FIG. 4 shows the robot pickup point 80. Boxes are generally loaded by robot arm 90 onto primary pallet 100 or, if too many heavy boxes arrive to be loaded on pallet 100, they may be loaded onto alternate pallet 99. Robot arm 90 operates under the control of robot controller 91, which receives carton placement positions from processor 70. The robot arm 90 picks cartons from conveyor 20 at pick-up point 80, and places each carton at locations on pallets 99 and 100 as specified by processor 70.

A damaged box, or a box the robot arm cannot handle, is allowed to stay on conveyor 20 and travel to the reject carton station 98. For example, if WDS 30 detects a large deviation from the size expected for the box, processor 70 will command the robot arm 90 to allow the box to go to reject carton station 98. In FIG. 4, the reject station is implemented differently from the pallet in FIG. 1A. The reject carton station might simply be a bin at the end of conveyor 20 into which reject boxes tumble. Alternatively, an additional conveyor system and work station could be provided to process reject boxes. Further, more than one palletizing system might have a conveyor feeding cartons to the reject carton station.

With regard to damaged boxes, two damage checks are done at the robot pick up point 80. One of these checks measures the force sensed by the robot arm as it attempts to grip the sides of the carton by moving the pick-up claws (not shown) together slowly. The robot controller 91 is told by processor 70, based on information from WDS 30, how big the box is supposed to be. If claw pressure is sensed either before or after it is expected, the robot controller assumes the box has been damaged. Another test performed by the robot arm controller uses suction cups or suckers (not shown) on the robot arm 90, and measures vacuum on the top of the carton as suction is drawn through the suckers. Inability to maintain a low pressure in the suckers when a box is gripped, indicates an open or crushed box. If either of these damage tests fail, the carton is allowed to continue to reject carton station 98.

Figure 5:
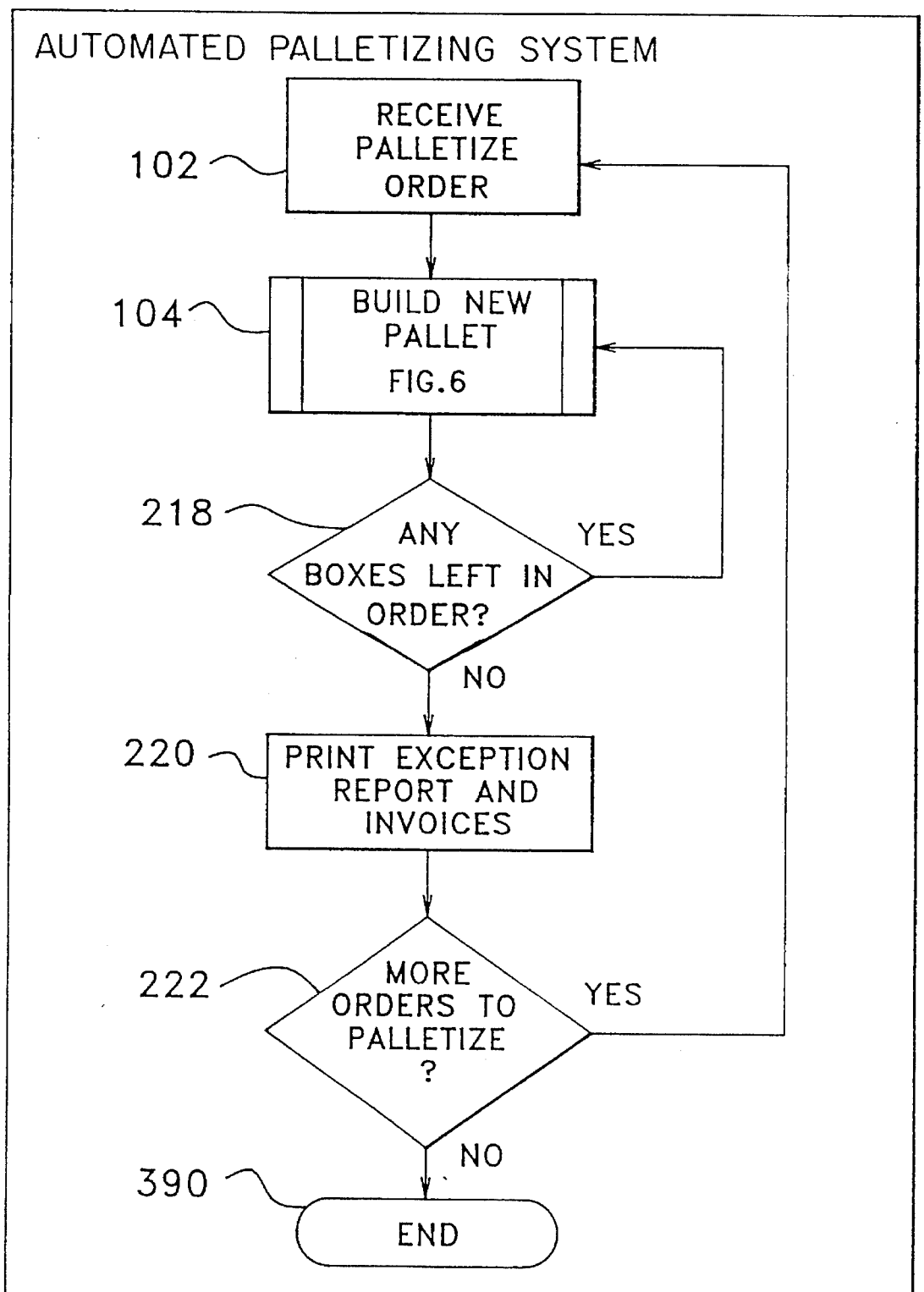
FIG. 5 is the highest level logic/flow diagram for determining pallet configuration in accordance with the present invention.

FIG. 5 is an overview diagram of the logic/flow diagram for the palletizing system. The system receives a palletizing order 102 from processor 70. Then, the system calls Build New Pallet process 104, described below and shown in FIG. 6. Decision 218 tests for boxes left to load, and returns to Build New Pallet process if boxes remain in the order. In process 104, the system remaps the pallet configuration for boxes remaining to be loaded each time a new carton is sensed by WDS 30. When the order is complete, operation 220 prints an exception report for reject cartons and an invoice list of cartons loaded on the pallet. Decision 222 tests for more orders to palletize. If there are more orders, flow passes back to operation 102. If there are no further orders to be filled, palletizing is complete and the logic/flow ends.

Figure 6:
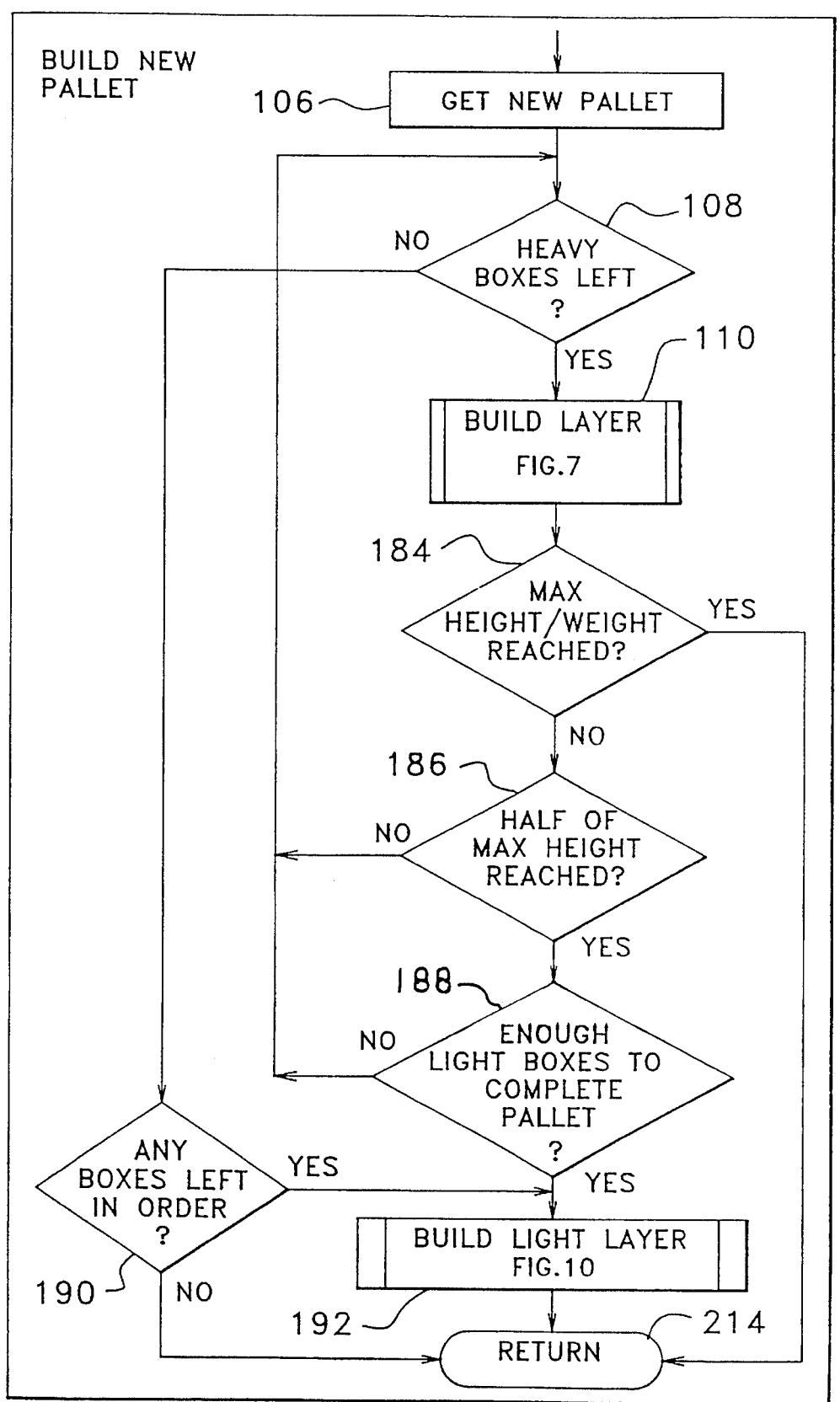
FIG. 6 shows a logic/flow diagram of building a new pallet.

FIG. 6 illustrates Build New Pallet process 104. In operation 106, a new pallet is positioned at the automated palletizing station. Decision 108 asks whether there are heavy boxes available to build a layer. If heavy boxes are available, the system calls Build Layer process 110, shown in FIG. 7. After the layer is built, decision 184 checks whether the maximum permissible height or weight for a pallet has been reached. If so, the system returns 214 to decision 218 (FIG. 5). If not, decision 186 tests whether half of the maximum height has yet been reached. If so, decision 188 asks whether enough light boxes are available to complete the pallet. If so, Build Light Layer process 192 is called. If decision 108 determined that no heavy boxes were left, decision 190 asks whether any boxes are left in the order. If so, Build Light Layer operation 192 is called. If decision 186 determines that half of the maximum height of the pallet has not yet been reached, flow passes back to decision 108 to check for more heavy boxes. If decision 188 determined that not enough light boxes were available to complete the pallet, process flow passes back to decision 108 to check for more heavy boxes.

Figure 7:
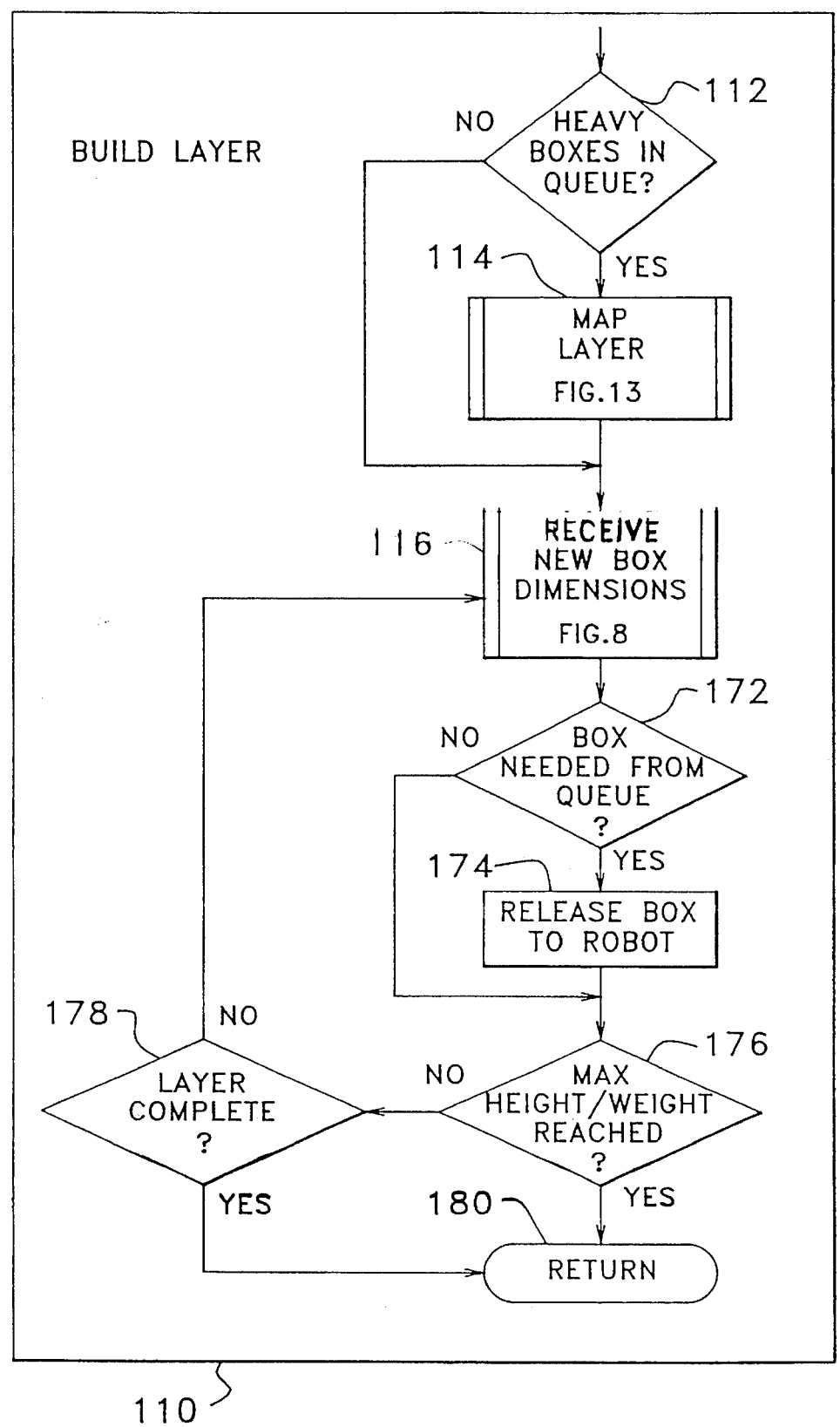
FIG. 7 shows a logic/flow diagram of building a layer.

FIG. 7 shows Build Layer process 110. Decision 112 asks if heavy boxes are available in the queue. If so, Map Layer process 114 is called (see FIG. 13). After the layer is remapped, Receive New Box Dimensions process 116 is called (see FIG. 8). Based on information from process 116, decision 172 determines whether the box currently on the conveyor was passed to the robot pick-up point or a box is needed from the queue. If a box from the queue is needed, operation 174 releases the selected box from the queue to the robot. Next, decision 176 checks whether maximum height and weight has been reached, and returns 180 to Build New Pallet operation 104 (FIG. 6) if the maximum was reached. If the maximum was not reached, decision 178 tests whether the layer is complete and returns if so. Otherwise, Receive New Box Dimensions process 116 is called again.

Figure 8:
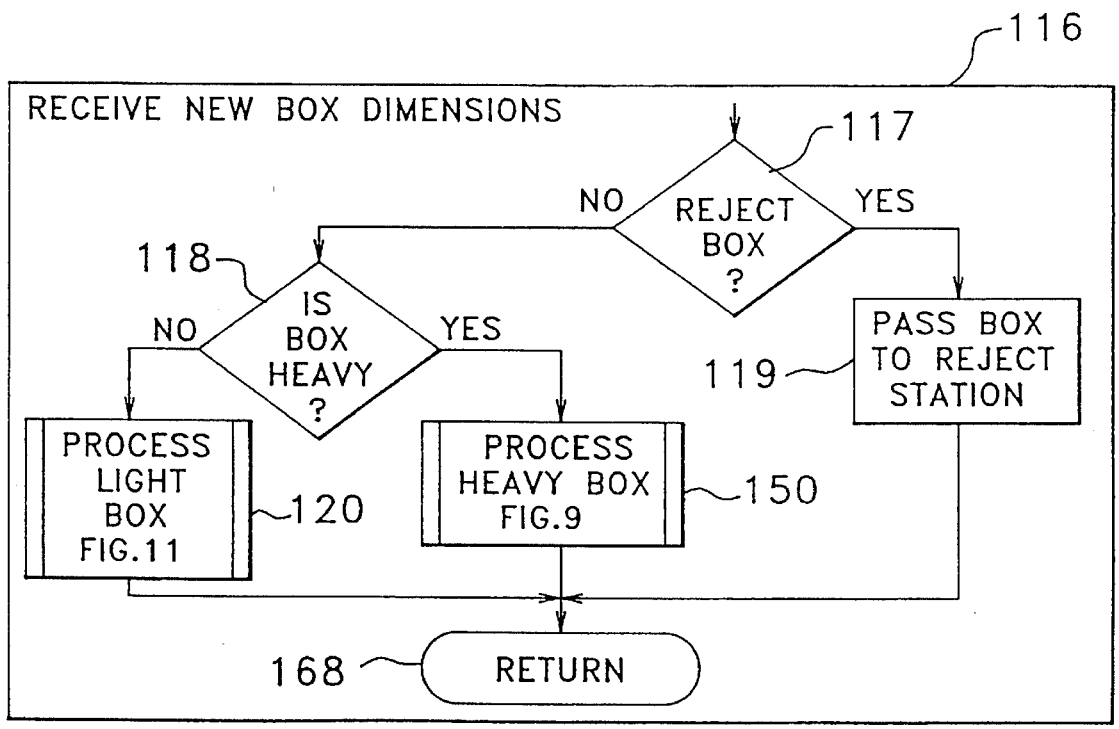
FIG. 8 shows a logic/flow diagram of receiving new box dimensions.

FIG. 8 shows Receive New Box Dimensions process 116. The system receives the weight and dimensions of a new box from WDS 30. Decision 117 tests whether the carton is a reject box, i.e., not capable of being picked up by the robot arm. If so, operation 119 passes the box to the reject carton station. Decision 118 determines whether the box is heavy, and calls Process a Light Box process 120 (see FIG. 11) or Process a Heavy Box process 150 (see FIG. 9), as appropriate. Then operation 168 returns to Build Layer (FIG. 7) or Build Light Layers (FIG. 10), whichever called it.

Figure 9:
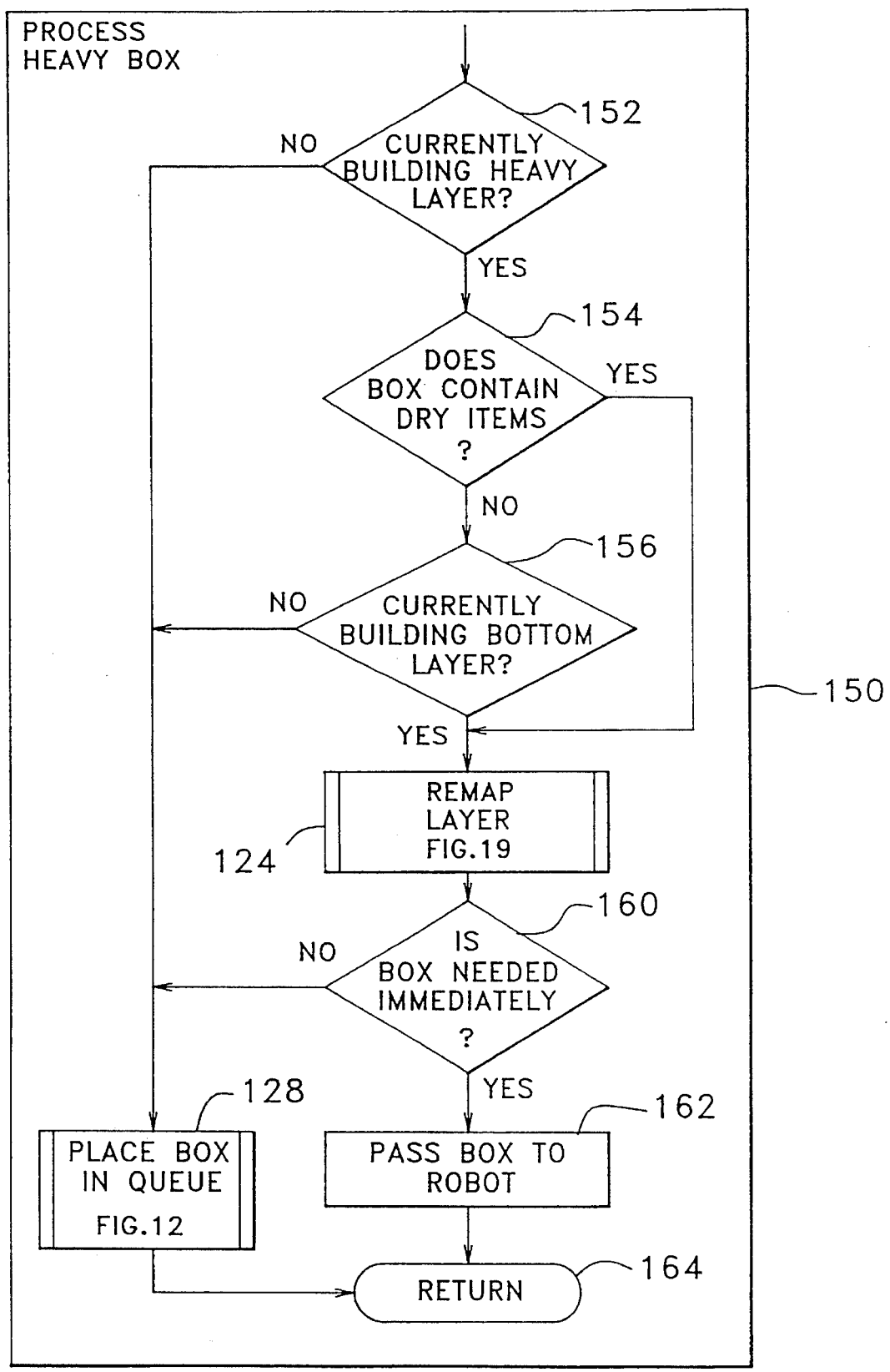
FIG. 9 shows a logic/flow diagram of processing a heavy box.

FIG. 9 shows Process Heavy Box process 150. Decision 152 asks if the system is currently building a heavy layer. If not, Place Box in Queue process 140 is called (see FIG. 12). Place Box in Queue process 140 is also called if decision 154 determines that the box contains wet items, and decision 156 determines that the layer being built is not the bottom layer. Otherwise, Remap Layer Process 124 is called (see FIG. 19). Decision 160 asks if the box is currently needed for the layer. If so, operation 162 passes it to the robot. Otherwise, Place Box in Queue process 140 is called. The system returns to Receive New Box Dimensions operation 116 (FIG. 8).

Figure 10:
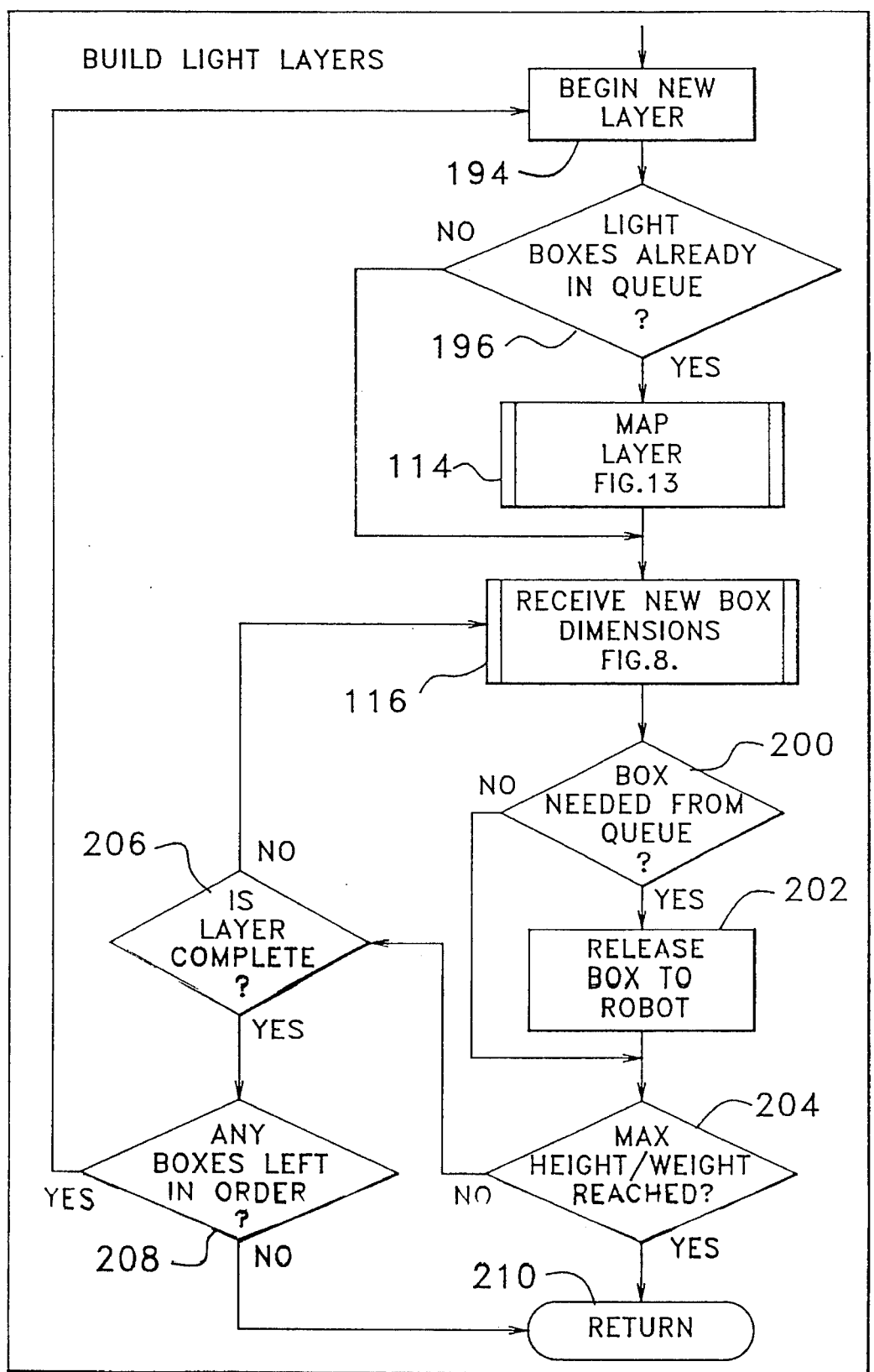
FIG. 10 shows a logic/flow diagram of building a layer of light boxes.

FIG. 10 shows Build Light Layer process 192 from FIG. 6. Operation 194 begins the process of building a new layer by removing the previous layer plan and its "already placed list" from memory in preparation for constructing a plan and list for the new layer. Decision 196 asks if there are light boxes in the queue. If so, Map Layer process 114 is called (see FIG. 13). Then Receive New Box Dimensions operation 116 is called (described above and shown in FIG. 8).

Decision 200 determines whether a box is needed from the queue. If so, operation 202 releases it to the robot. Decision 204 then checks if maximum weight or height has been reached. If so, operation 210 returns to Build New Pallet (FIG. 6). Operation 210 also returns when decision 206 determines the layer is complete, and decision 208 determines there are no more boxes left in the order. If decision 206 determines the layer is not complete, flow returns to operation 116. If the layer is complete but decision 208 finds there are boxes left, flow returns to operation 194 to begin another layer.

Figure 11:
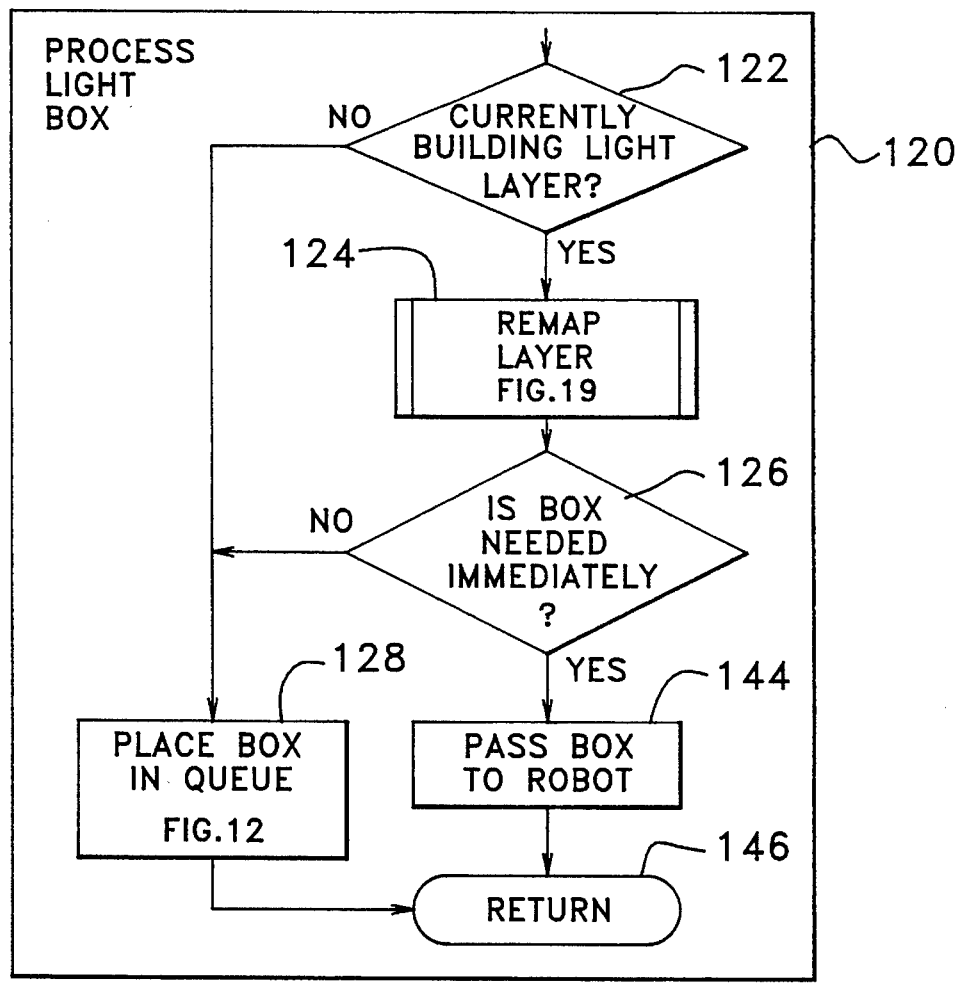
FIG. 11 shows a logic/flow diagram of processing a light box.

FIG. 11 shows Process Light Box process 120. It is called from Receive New Box Dimensions process 116 (FIG. 8). Decision 122 asks if a light layer is currently being built. If so, Remap Layer process is called. Decision 126 determines whether the new box can be used immediately. If so, Operation 144 passes it to the robot. Otherwise Place Box in Queue process 128 is called (see FIG. 12). Then the system returns to Receive New Box Dimensions process 116.

Figure 12:
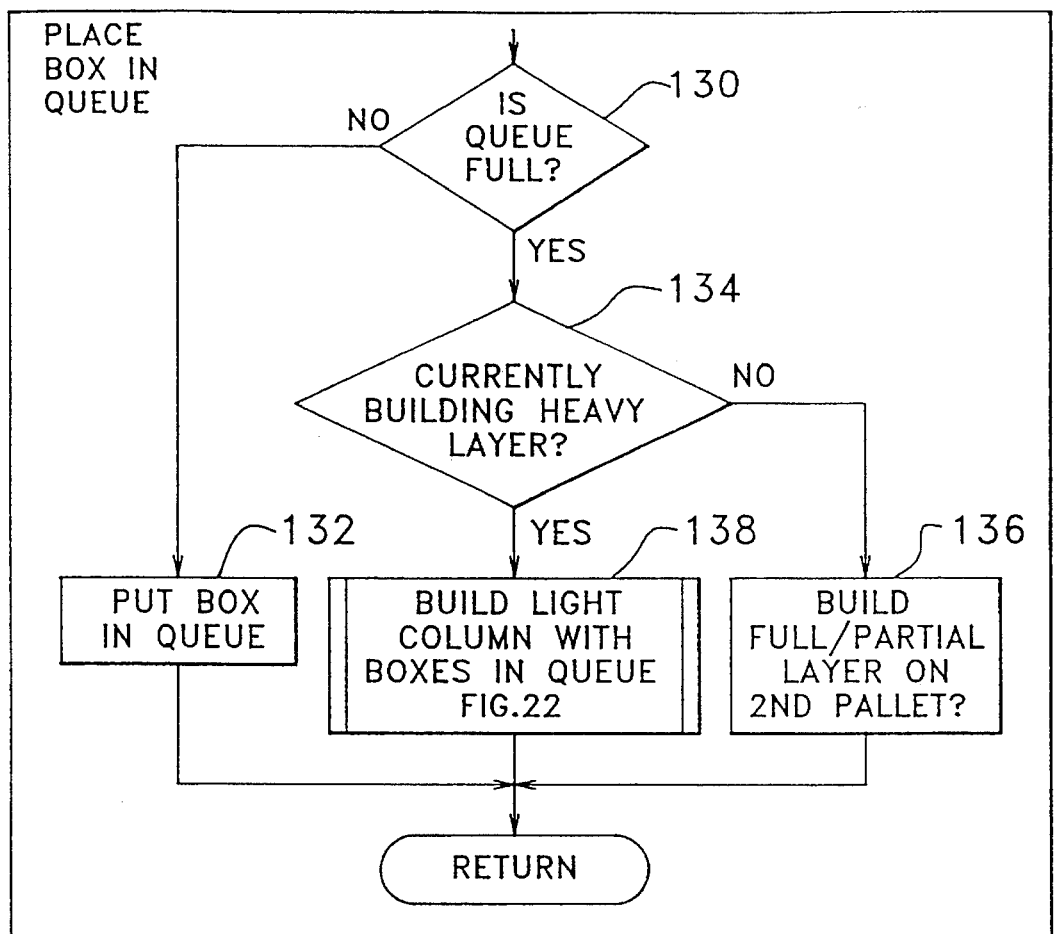
FIG. 12 shows a logic/flow diagram of placing a box in the queue.

FIG. 12 shows Place Box in Queue process 140. It is called from Process Light Box process 120 and Process Heavy Box process 150. Decision 130 first checks to see whether the queue is full. If not, operation 132 places the box in the queue, and operation 140 returns the process control to whichever routine called Place Box in Queue. If the queue is full, decision 134 checks whether a heavy layer is being built. If not, operation 136 directs the robot arm to load heavy boxes to a second pallet. If so, Build Light Column With Boxes in Queue process 138 is called (see FIG. 22).

Figure 13:
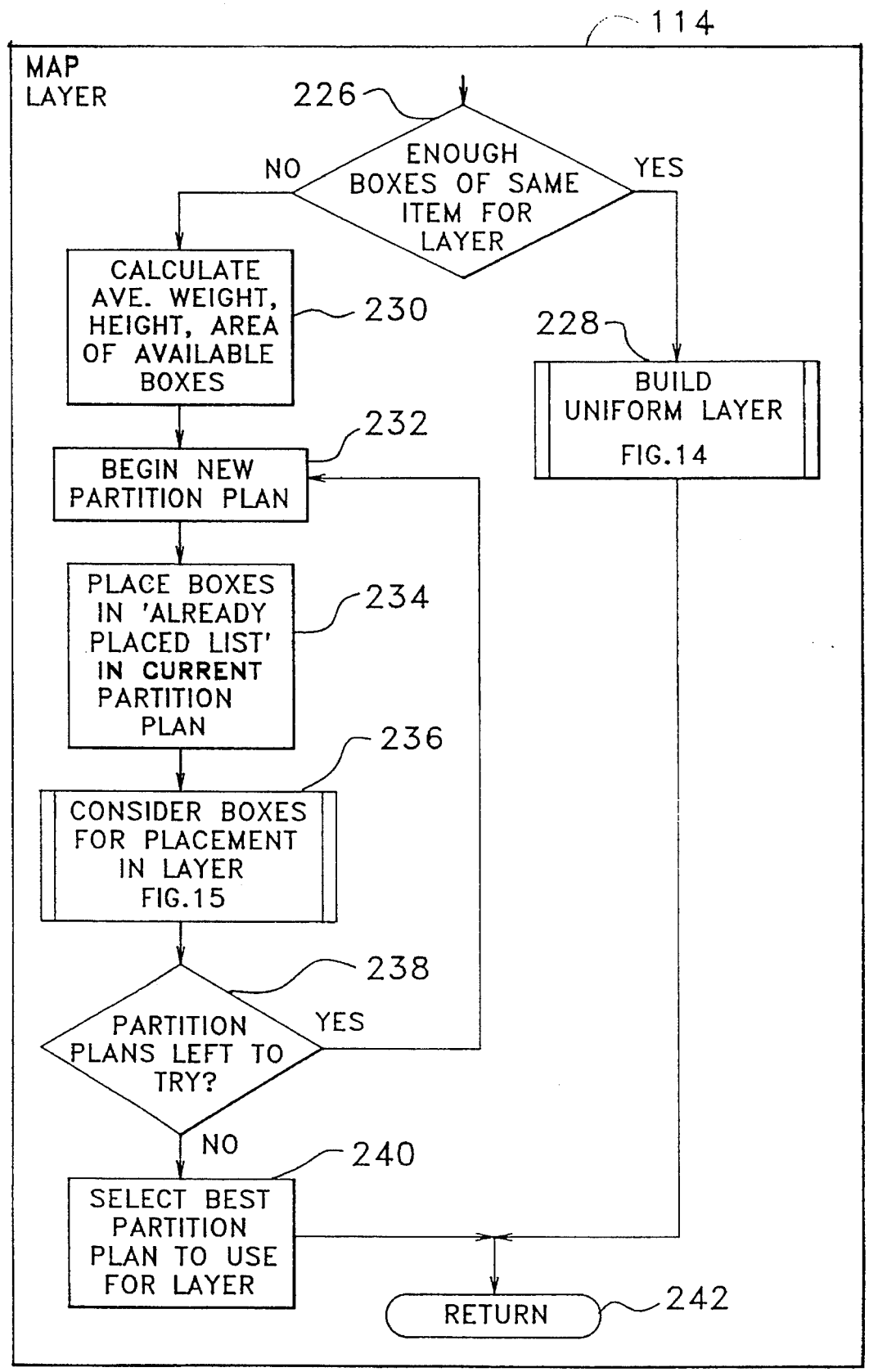
FIG. 13 shows a logic/flow diagram of mapping a layer.

FIG. 13 shows Map Layer process 114. It is called from Build Layer process 110, Build Light Layers process 192, and Remap Layer process 124. Decision 226 first checks whether enough boxes of the same type are available to make up a layer. If so, Build Uniform Layer process 228 is called (see FIG. 14). If not, operation 230 calculates the average weight, height, and area of available boxes. Operation 232 starts a first partition plan, and operation 234 puts boxes that have already been loaded on the pallet on the "already placed" list. A set of predetermined partition plans are available at the processor. Each plan partitions the pallet into two vertical sections. Consider Boxes for Placement in Layer process 236 is called (see FIG. 15). Decision 238 checks whether any partition plans remain to be tried, and returns to operation 232 if so. All partition plans may be tried. Alternatively, only certain plans may be tried based on information about the available boxes such as their average weight, height and area as determined by operation 230. After all plans, or all selected plans, have been tried, operation 240 selects the best partition plan in terms of levelness, cube efficiency, etc., to use for the current layer, and returns.

Figure 14:
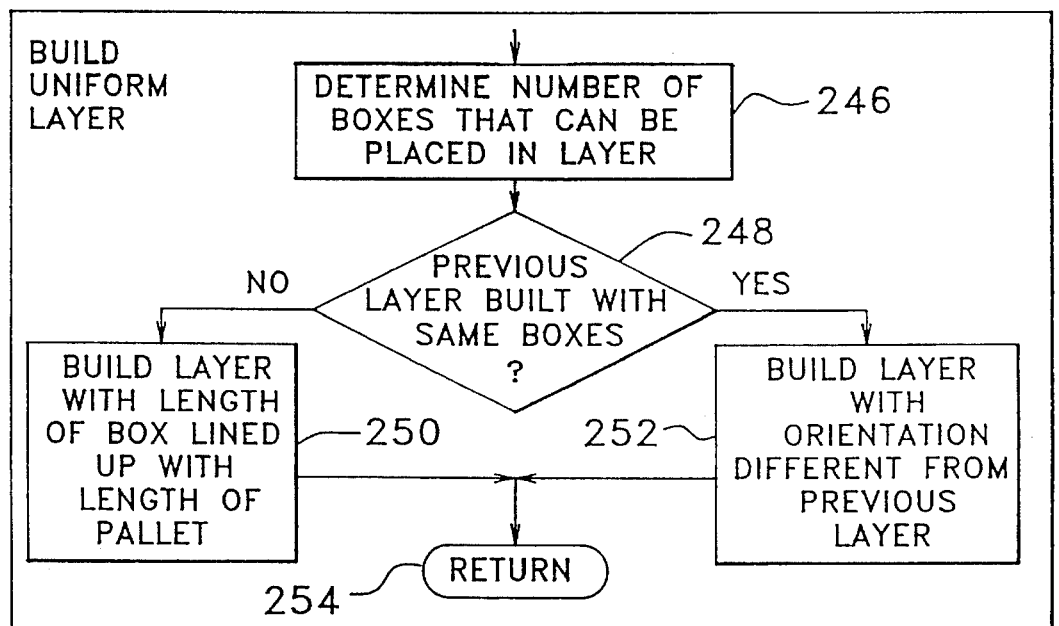
FIG. 14 shows a logic/flow diagram of building a uniform layer.

FIG. 14 shows Build Uniform Layer process 228. It is called from Map Layer process 114. Operation 246 determines how many boxes can be placed in the layer. Decision 248 checks whether the previous layer was built with the same boxes and, if so, operation 252 builds the layer with a different orientation than the last layer. Otherwise, operation 250 builds the layer so that the length of the boxes lines up with the length of the pallet. Operation 254 returns.

Figure 15:
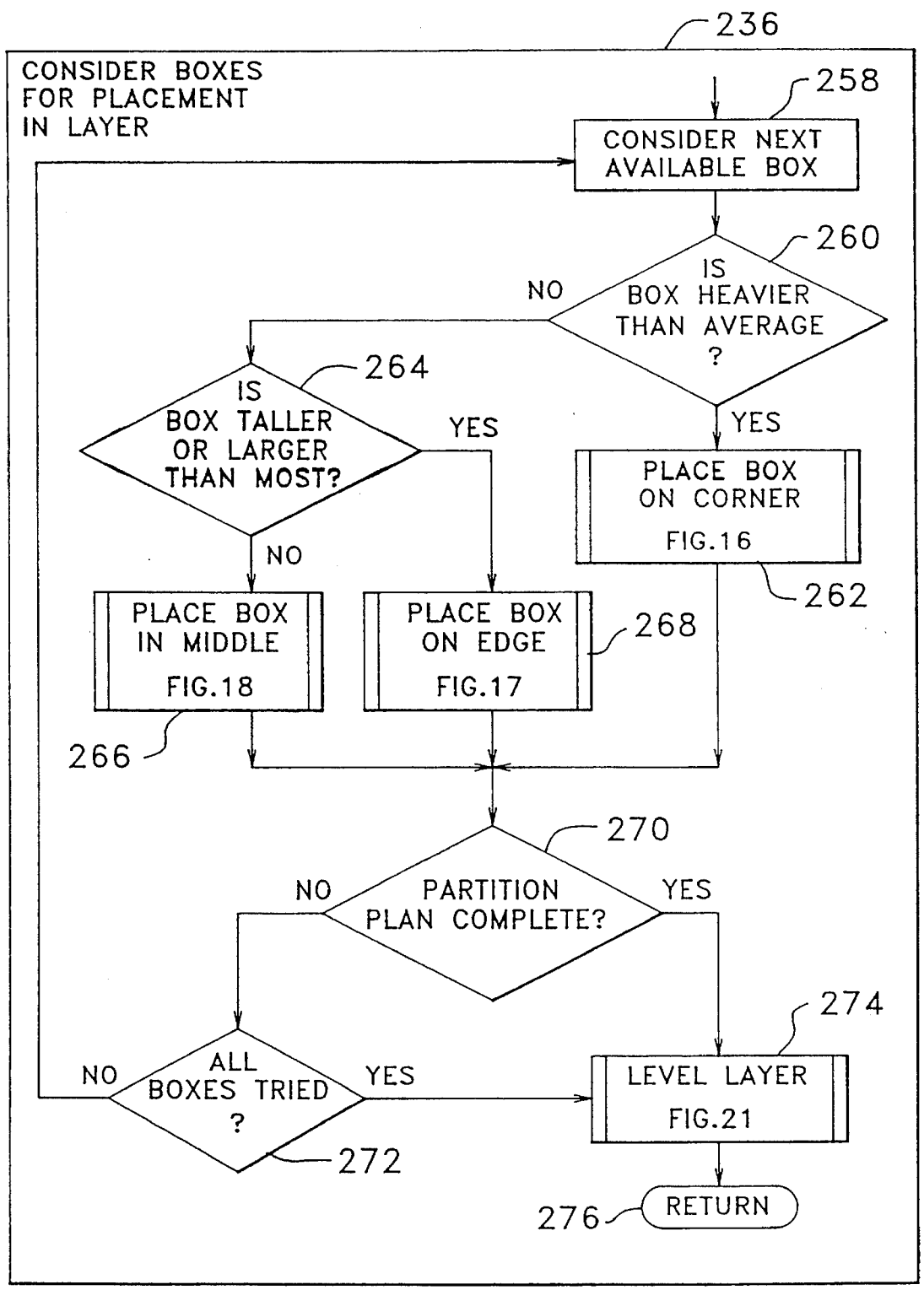
FIG. 15 shows a logic/flow diagram of considering boxes for placement in a layer.

FIG. 15 shows Consider Boxes for Placement in a Layer process 236. It is called from Map Layer process 114. Operation 258 considers the next available box by performing a table look up to determine the characteristics of the boxes available in the queue and the next box to arrive on the conveyor. Decision 260 checks whether the box is heavier than average. If so, Place Box on Corner process 262 is called. If not, decision 264 checks whether the box is taller or larger than average. If so, Place Box on Edge process 268 is called. If not, Place Box in Middle process 266 is called. Decision 270 checks whether the partition plan is complete. If so, Level Layer process 274 is called. If not, decision 272 checks whether all available boxes have been tried. If not, return to operation 258. If so, Level Layer process 274 is called. Operation 276 returns.

Figure 16:
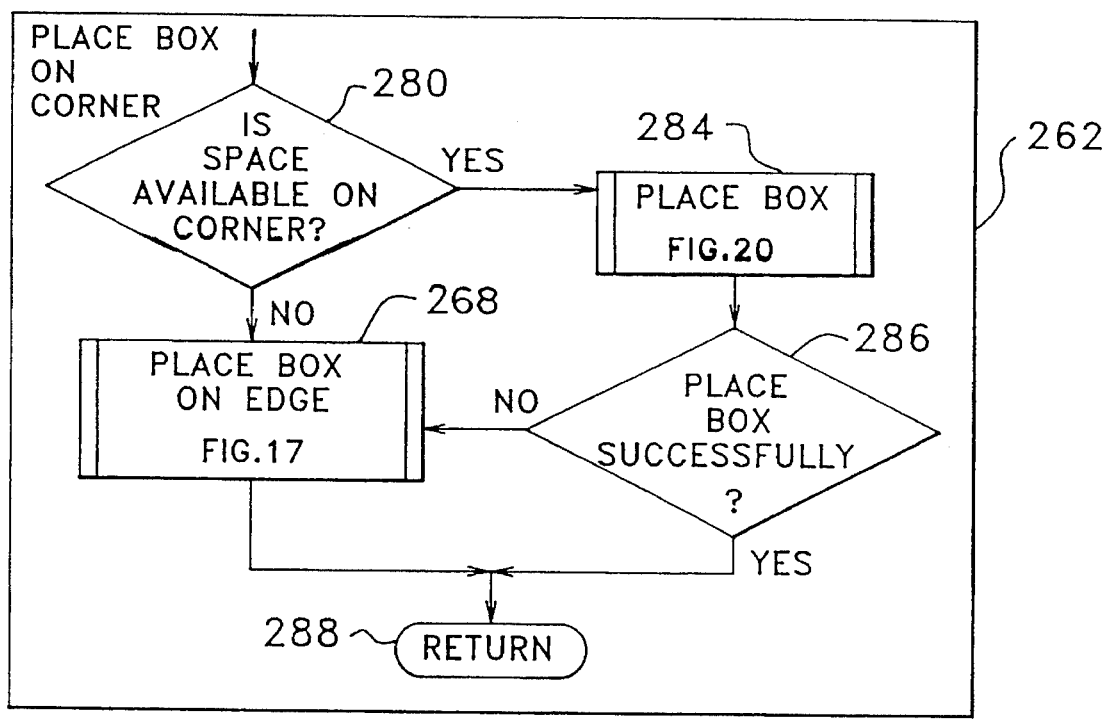
FIG. 16 shows a logic/flow diagram of placing a box on the corner of the pallet.

FIG. 16 shows Place Box on Corner process 262. It is called from Consider Boxes for Placement in Layer process (FIG. 15). Decision 280 checks whether space is available for the box on the corner. If so, Place Box operation 284 is called. Decision 286 checks whether the box was successfully placed. If not, Place Box on Edge operation 268 is called. If no space was available on a corner, Place Box on Edge operation 268 is called. Operation 288 returns.

Figure 17:
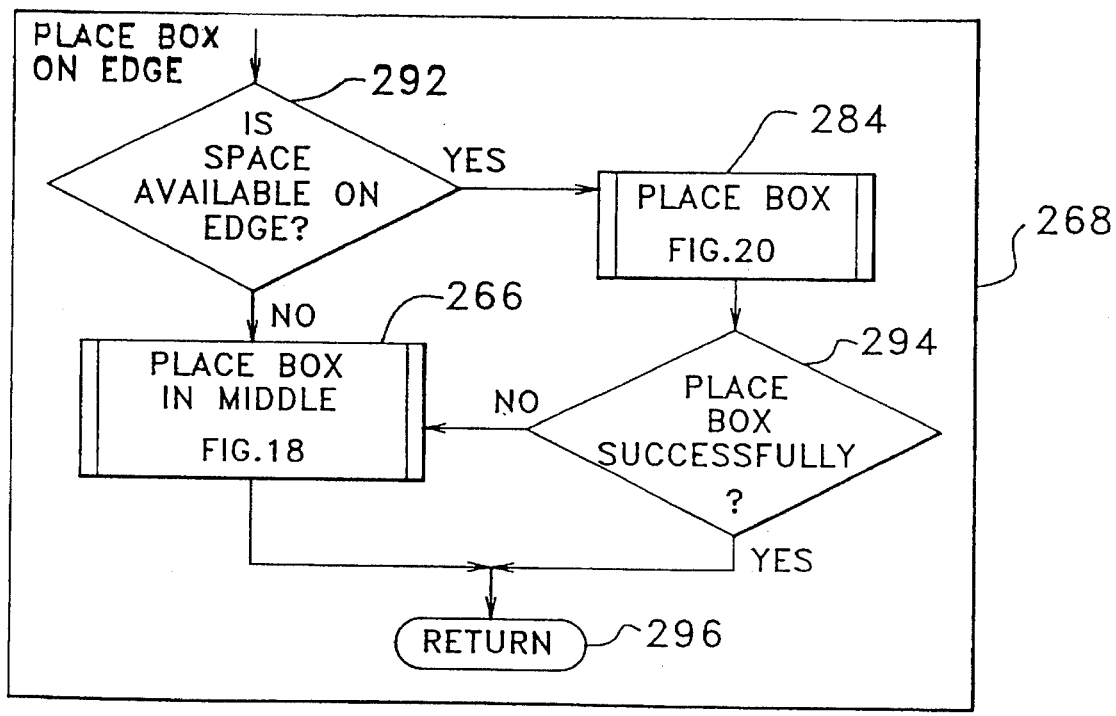
FIG. 17 shows a logic/flow diagram of placing a box on the edge of the pallet.

FIG. 17 shows Place Box on Edge operation 268. It is called from Consider Boxes for placement in Layer operation 236 (FIG. 15) and Place Box on Corner operation 262 (FIG. 16). Decision 292 checks whether any space is available along an edge for the box. If so Place Box operation 284 is called. Decision 294 checks whether the box was placed successfully. If not, Place Box in Middle operation 266 is called. If no space was available along the edge, Place Box in Middle operation 266 is also called. Operation 296 returns.

Figure 18:
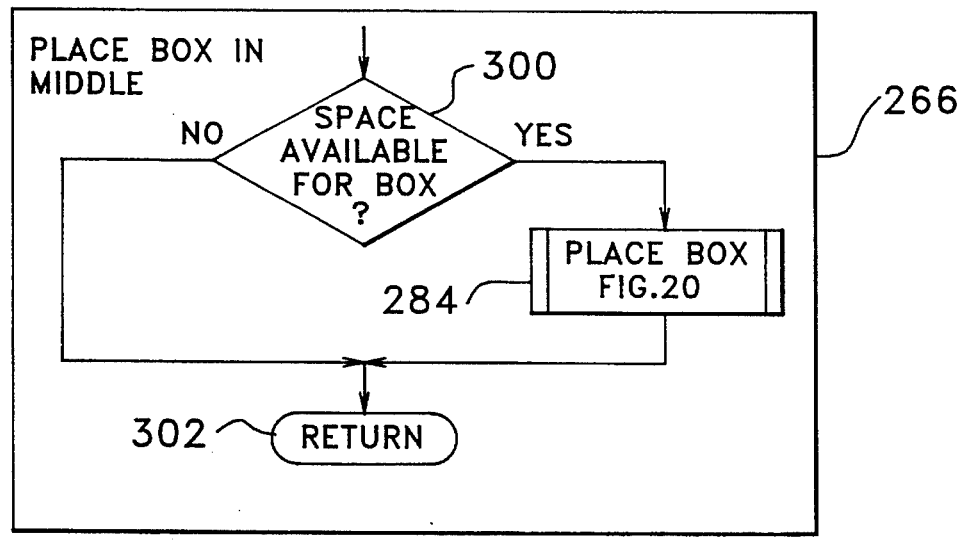
FIG. 18 shows a logic/flow diagram of placing a box in the middle of the pallet.

FIG. 18 shows Place Box in Middle operation 266. It is called by Consider Boxes for Placement in Layer operation 236 and Place Box on Edge operation 268. Decision 300 checks whether space is available for the box anywhere. If so, Place Box operation 284 is called. Operation 302 returns.

Figure 19:
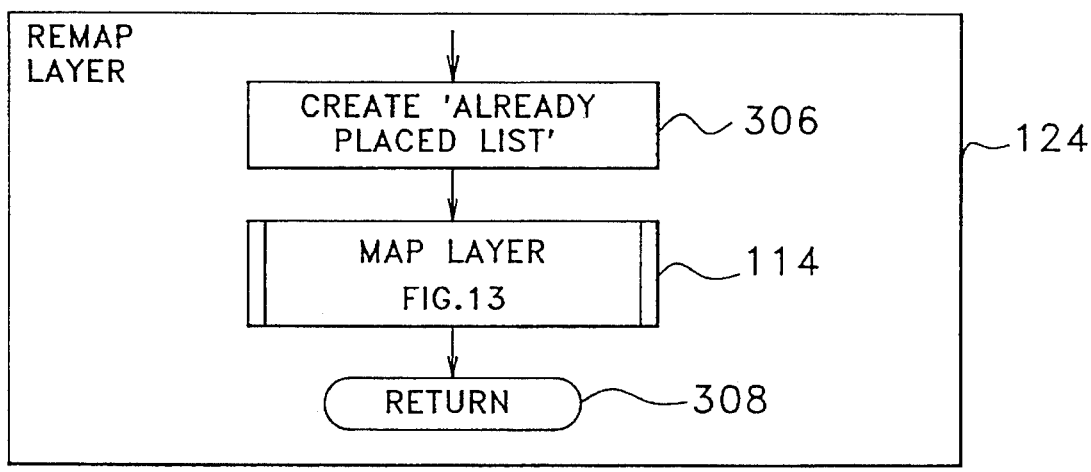
FIG. 19 shows a logic/flow diagram of remapping a layer.

FIG. 19 shows Remap Layer operation 124. It is called from Process Heavy Box operation 150 and Process Light Box operation 120. Operation 306 creates an "already placed list" of boxes, consisting of those boxes which have already been loaded on the pallet and must be included in any new plan. To create a new plan, Map Layer process 114 is called. Operation 308 returns.

Figure 20:
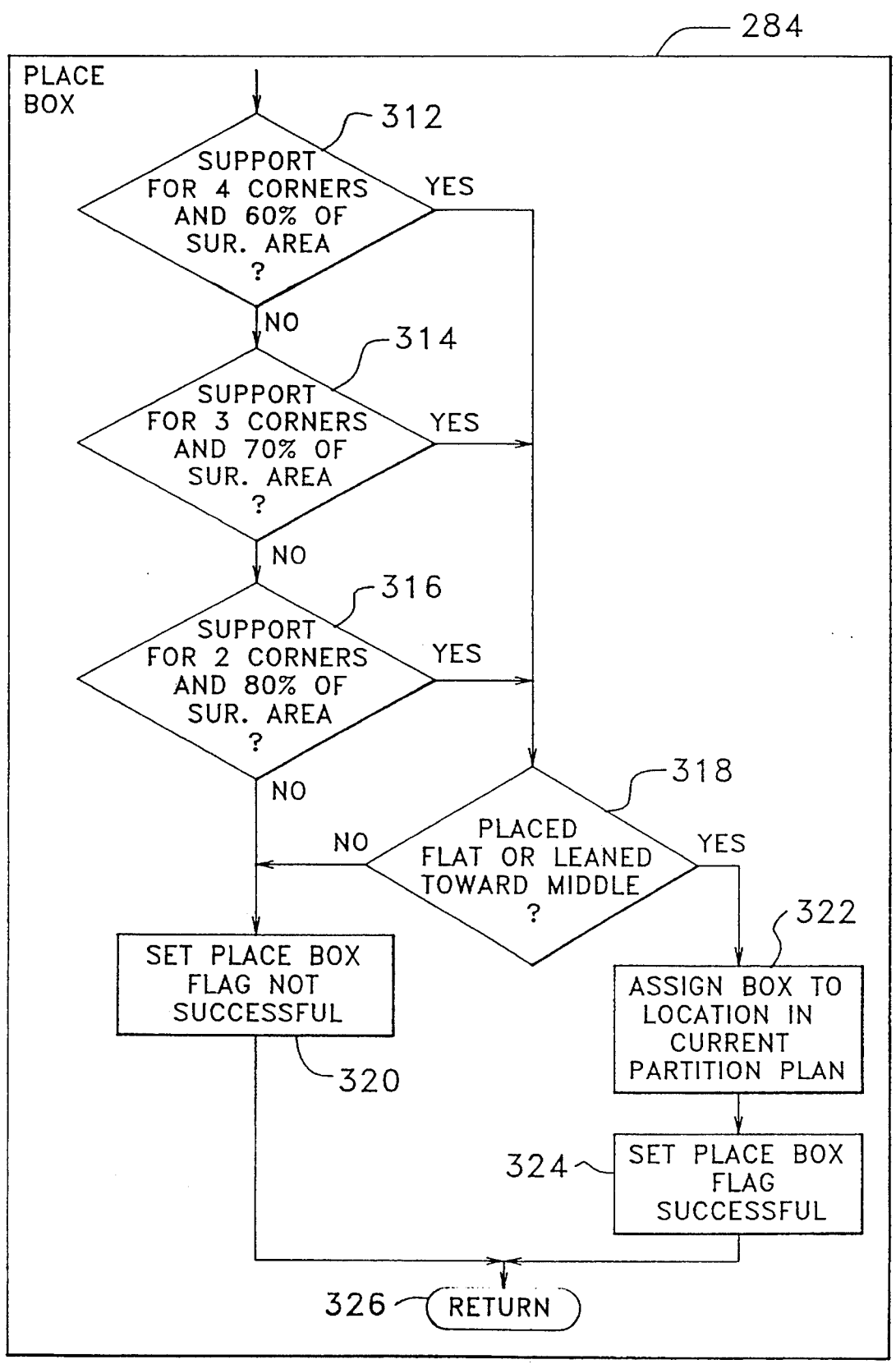
FIG. 20 shows a logic/flow diagram of placing a box.

FIG. 20 shows Place Box operation 284. It is called from Place Box on Corner operation 262, Place Box on Edge operation 268, Place Box in Middle operation 266, Level Layer operation 274 (see FIG. 21), and Consider Boxes for Placement in Column operation 354 (see FIG. 24). Decision 312 checks whether the proposed position for the box supports four corners and 60% of the surface area of the box. If not, decision 314 checks whether the position supports three corners and 70% of the surface area of the box. If not, decision 316 checks whether the position supports two corners and 80% of the area of the box. If not, operation 320 sets the Place Box flag to "not successful". If any of the above three decisions is positive, Decision 318 checks the orientation of the box. If it is flat or leaning toward the middle of the pallet, operation 322 assigns the box to that position in the current partition plan. Operation 324 sets the Place Box flag to "successful". If the orientation is wrong, operation 320 sets the flag to "not successful". Operation 326 returns.

Figure 21:
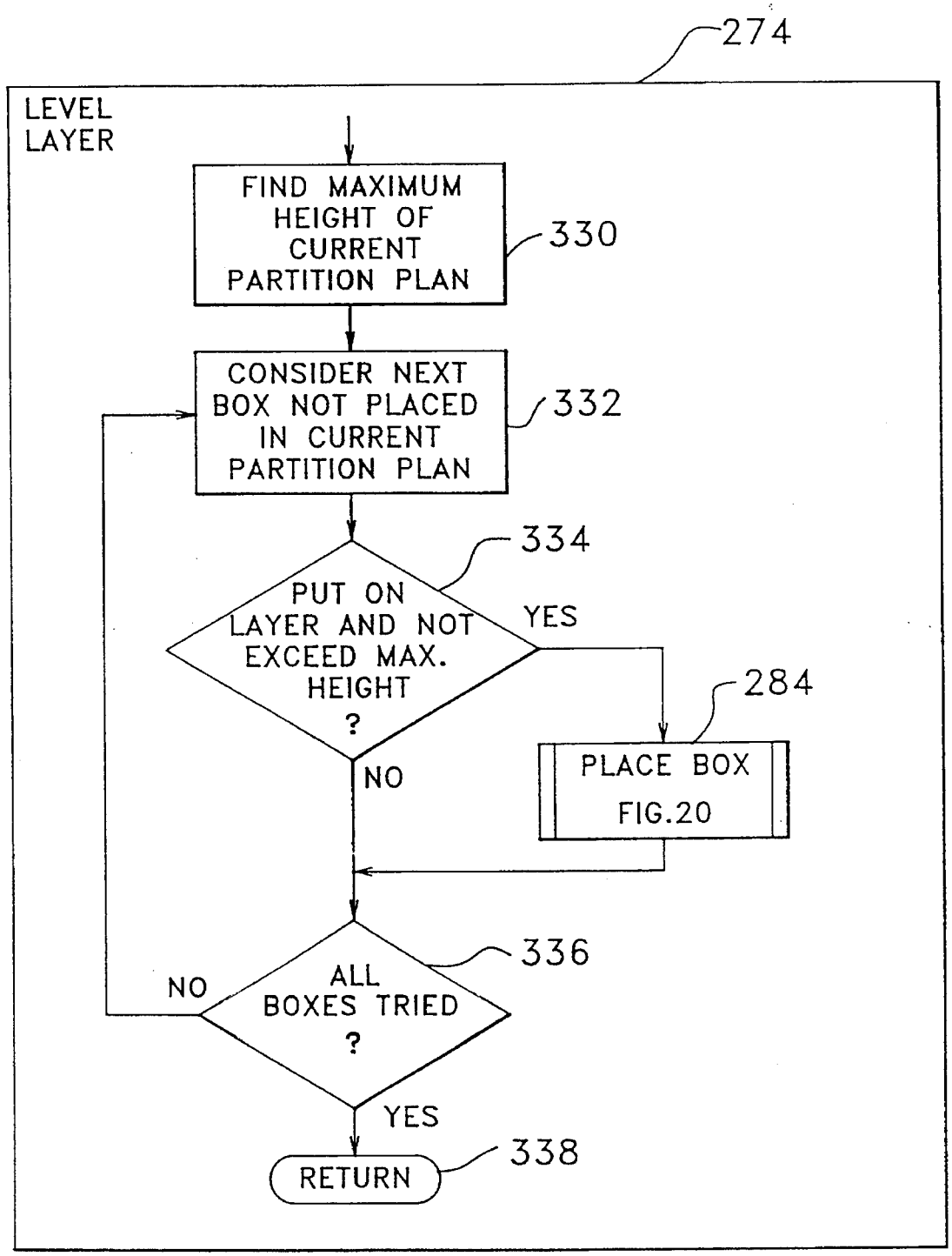
FIG. 21 shows a logic/flow diagram of levelling the current layer.

FIG. 21 shows Level Layer operation 274. It is called from Consider Boxes for Placement in Layer operation 236. Operation 330 determines the maximum height of the current partition plan. Operation 332 looks up all of the boxes available to the system (those in the queue and the next box on the conveyor) that are not already in the current layer plan. Decision 334 checks whether the current box can be placed anywhere on the pallet and not exceed the maximum height of the current partition plan. If it can, Place Box operation 284 is called. Decision 336 checks whether all of the boxes have been tried. If not, return to operation 332. Operation 338 returns.

Figure 22:
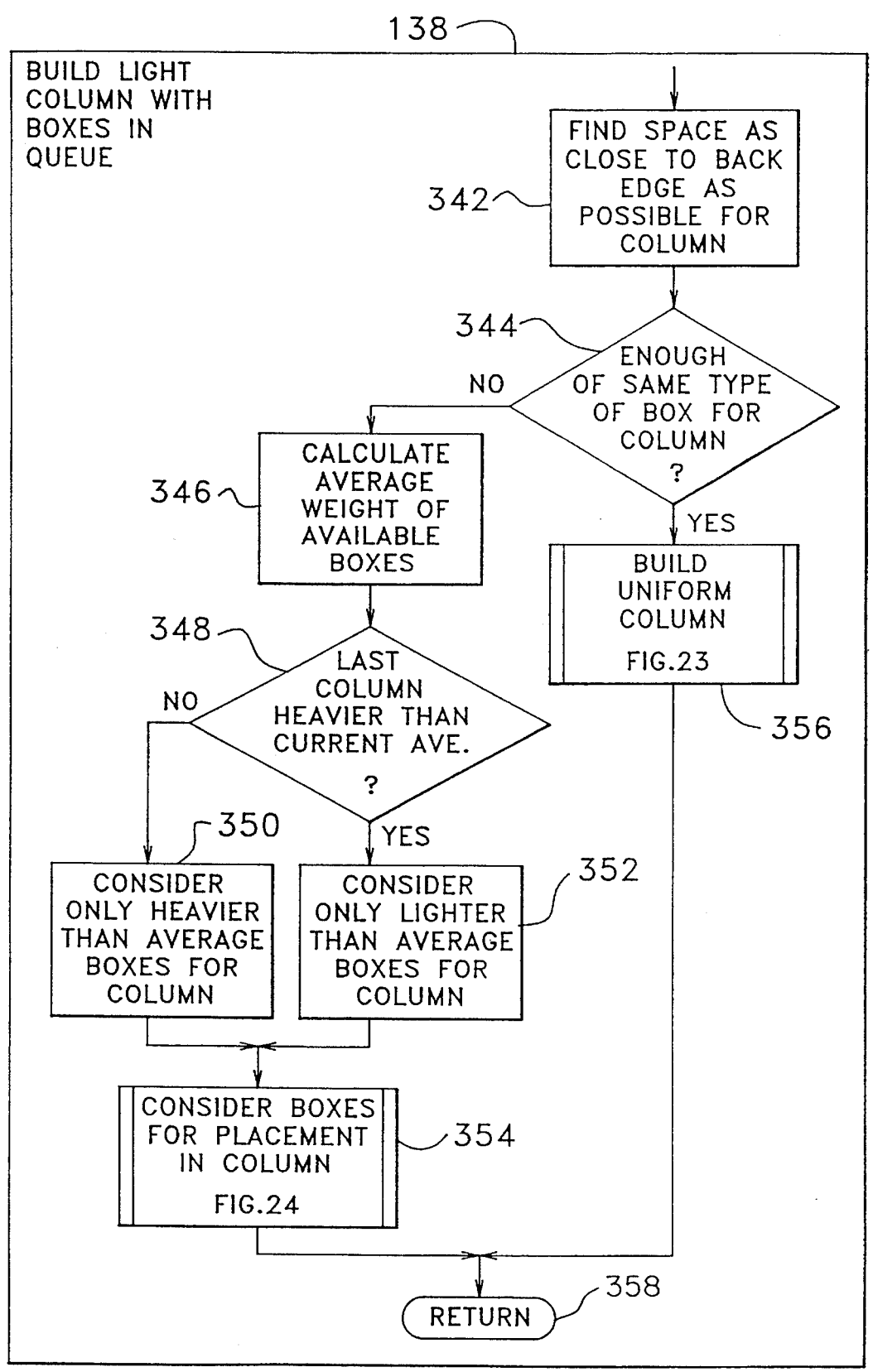
FIG. 22 shows a logic/flow diagram of building a light column.

FIG. 22 shows Build Light Column operation 138. It is called from Place Box in Queue operation 140. Operation 342 finds space for the column as close to the back edge of the pallet as possible. Decision 344 checks whether enough boxes of the same type are available to build a column. If so, Build Uniform Column operation 356 is called. If not, operation 346 calculates the average weight of the available boxes. Decision 348 checks whether the average weight of the boxes in the last column built was heavier than the average box currently available. If so, operation 352 considers only lighter than average boxes for this column. If not, operation 350 considers only heavier than average boxes for the column. This is done for increased stability. In either event Consider Boxes for Placement in Column operation 354 is called next (see FIG. 24). Operation 358 returns.

Figure 23:
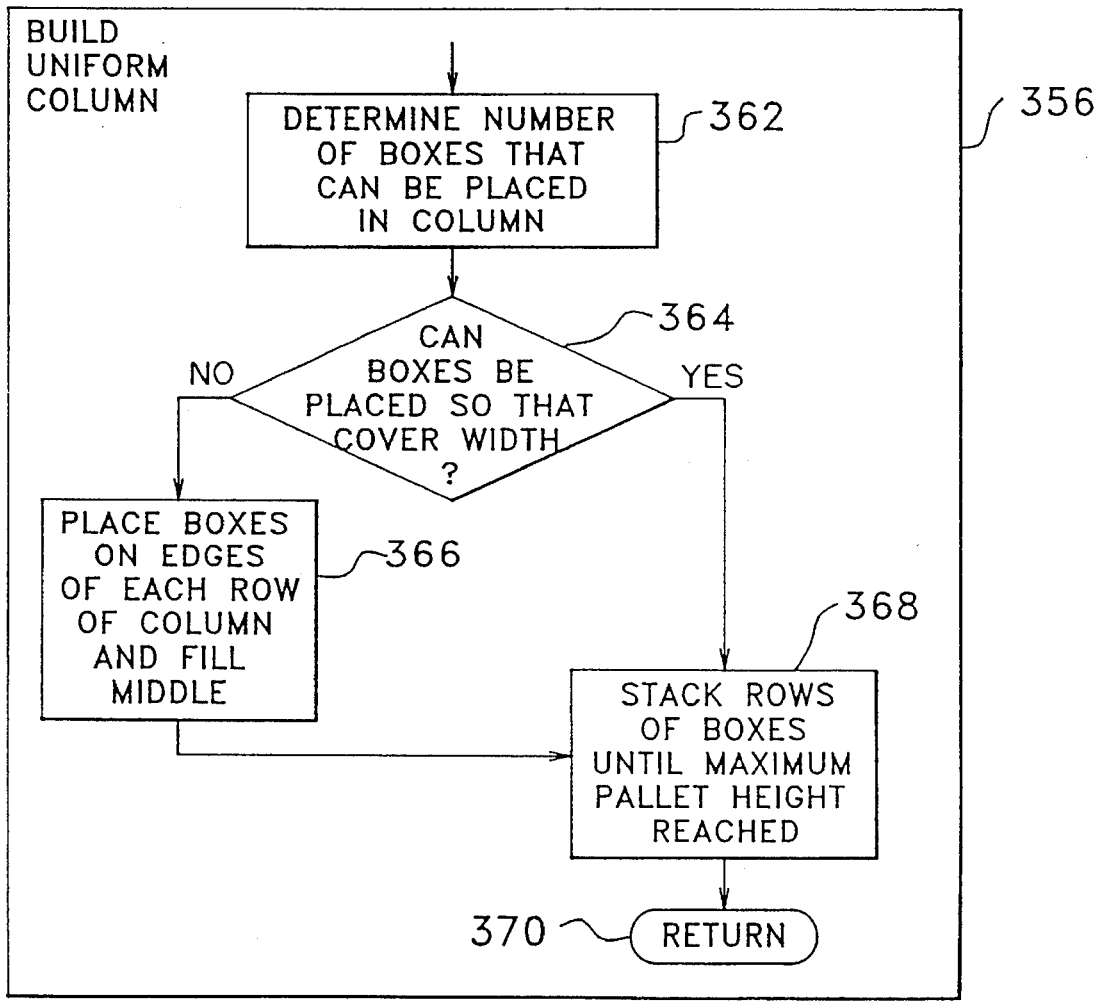
FIG. 23 shows a logic/flow diagram of building a uniform column.

FIG. 23 shows Build Uniform Column operation 356. It is called from Build Light Column Operation 138. Operation 362 determines how many boxes can be placed in a column. Decision 364 determines whether the boxes can be placed so that the columns exactly cover the width of the pallet. If not, operation 366 places boxes on the edges of the pallet and leaves equal gaps between the boxes in the row to make up for the shortage. Operation 368 stacks rows of boxes until the maximum pallet height is reached. Operation 370 returns.

Figure 24:
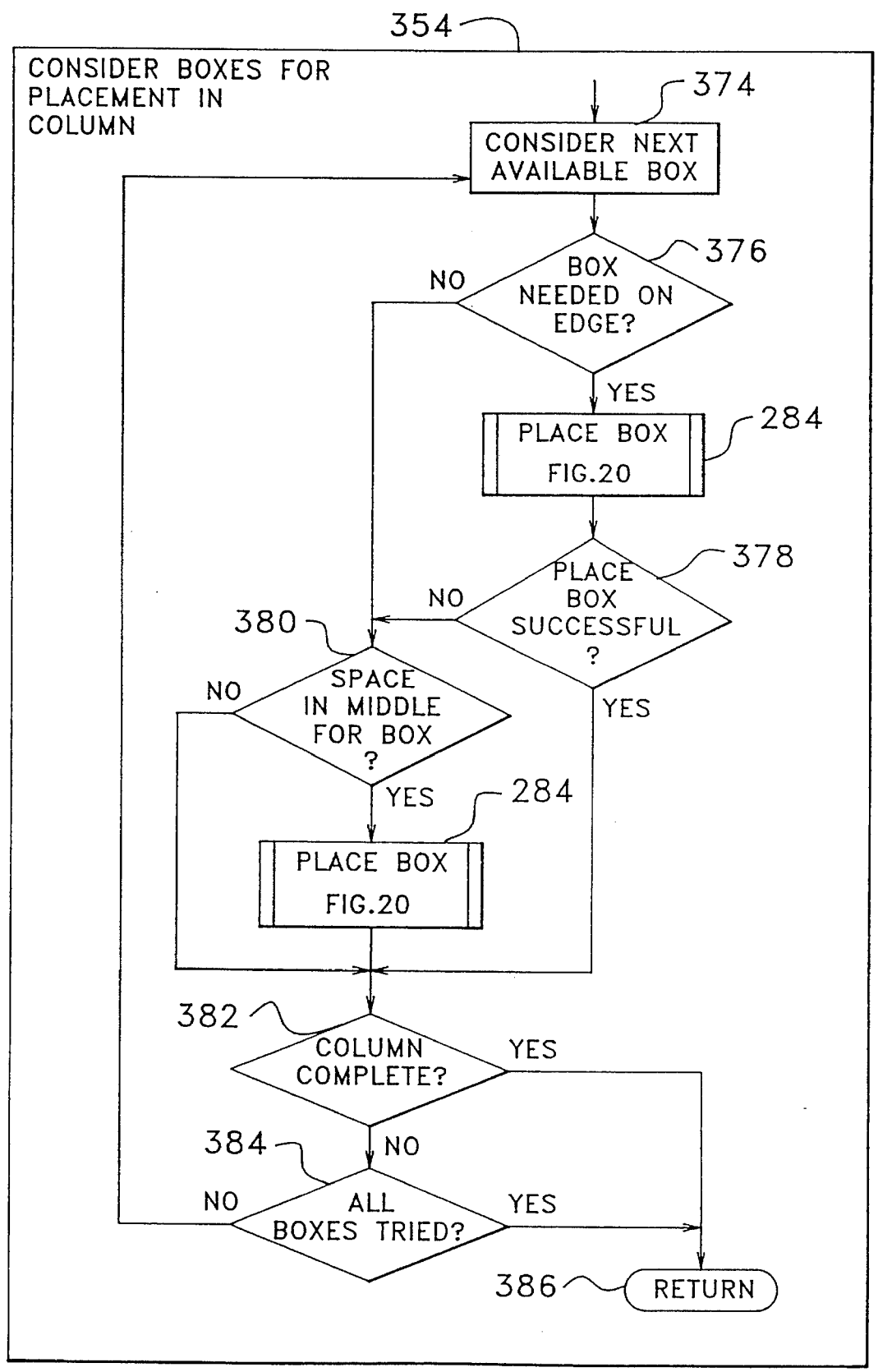
FIG. 24 shows a logic/flow diagram of considering a box for placement in a column.

FIG. 24 shows Consider Boxes for Placement in Column operation 354. It is called from Build Light Column operation 138. Operation 374 considers the next box available by looking up the next box on the conveyor and the boxes in the queue. Decision 376 checks whether a box is needed on the edge. There must be boxes flush with each edge for each column, so the edge boxes are placed first and then the middle is filled in. If a box is needed on the edge, Place Box operation 284 is called. Decision 378 checks whether the box was placed successfully. If not, or if there was no room along the edge, decision 380 checks whether there is space in the middle for a box. If so, Place Box operation 284 is called. Decision 382 checks whether the column is complete. If not, decision 384 checks whether all of the boxes have been tried. If not, return to operation 374. Operation 386 returns.

While a number of preferred embodiments of the invention have been shown and described, it will be appreciated by one skilled in the art, that a number of further variations or modifications may be made without departing from the spirit and scope of our invention.

What is claimed is:

1. A method for automatically palletizing cartons on a pallet without a priori knowledge of the cartons to be palletized, using a robot to pick cartons from a conveyor carrying the cartons to the robot, said method comprising the steps of:

detecting each carton as said carton moves onto the conveyor;

recording an entry time for each carton entering the conveyor;

computing a location of each carton on the conveyor from the entry time of said carton;

weighing each carton as said carton moves onto the conveyor to produce weight data;

measuring the dimensions of each carton as said carton moves onto the conveyor to obtain dimensional data;

building and continuously maintaining a computer file of location, weight data, and dimensional data of each carton on the conveyor;

utilizing an expert system to continuously map the best loading sequence and optimal location of the cartons on a pallet;

reordering up to a predetermined number of the cartons on the conveyor to permit the sequence of loading mapped by said expert system; and loading the cartons onto a pallet with the robot in the sequence and locations mapped by the expert system.

2. The method of claim 1 wherein a permissible loading height is assigned to said pallet and said mapping step comprises the steps of:

building heavy layers of cartons for the bottom half of said permissible height so long as heavy cartons are available;

building walls of light cartons if no heavy cartons are available to the robot for loading after said reordering step and the height of cartons on the pallet is less than half of the permissible height;

building light layers of cartons when the height of cartons on the pallet is greater than or equal to half of the permissible height so long as light cartons are available to the robot; and building heavy layers of cartons on a second pallet if no light cartons are available for loading after reordering and the height of cartons on the first pallet is greater than or equal to half of the permissible height.

3. The method of claim 2 wherein each of said building layers steps comprises the steps of:

storing a set of partition plans in processor memory;

selecting the best partition plan for the current layer according to such factors as levelness and cube efficiency;

testing each partition plan as each new carton is presented, and replacing the selected partition plan with a new partition plan if the new partition plan has become better according to the factors, taking into account the cartons already loaded onto said pallet, and further loading cartons onto said pallet according to said best partition plan.

4. The method of claim 2 wherein said step of building walls comprises the steps of:

selecting a wall location as close as possible to the back edge of said pallet;

building a wall all of one type of carton if enough are available to the robot for loading;

placing a carton at each side of said wall location to act as edge cartons;

placing cartons between said edge cartons such that the same amount of space is left between each carton;

stacking cartons in layers to the permissible height of said pallet; and if more than one wall is needed, alternating walls of heavier than average cartons and lighter than average cartons on the pallet for stability.

5. The method of claim 1, further including the steps of:

identifying the carton to determine the contents of each carton when said carton is detected; and using carton contents as a factor when selecting the optimal location of each carton.

6. The method of claim 5, further including the step of:

printing a list of the contents of each carton loaded on the pallet.

7. The method of claim 1, further including the steps of:

determining whether a carton is appropriate for palletizing as said carton moves onto the conveyor based on factors including size, weight, and damage to cartons; and diverting a carton to a reject station if said carton is found not appropriate for palletizing by the determining step.

8. A method for automatically palletizing cartons on a pallet without a priori knowledge of the cartons to be palletized, using a robot to pick cartons from a conveyor carrying the cartons to the robot, said method comprising the steps of:

detecting each carton as said carton moves onto the conveyor;

weighing each carton as said carton moves onto the conveyor to produce weight data;

measuring the dimensions of each carton as said carton moves onto the conveyor to obtain dimensional data;

building a computer file of weight data and dimensional data of each carton on the conveyor;

utilizing an expert system to continuously map the best loading sequence and optimal location of the cartons on a pallet;

reordering up to a predetermined number of the cartons on the conveyor to permit the sequence of loading mapped by said expert system; and loading the cartons onto a pallet with the robot in the sequence and locations mapped by the expert system.

9. The method of claim 8 wherein a permissible loading height is assigned to said pallet and said mapping step comprises the steps of:

building heavy layers of cartons for the bottom half of said permissible height so long as heavy cartons are available; and building light layers of cartons when the height of cartons on the pallet is greater than or equal to half of the permissible height so long as light cartons are available to the robot.

10. The method of claim 9 and further including the step of:

building heavy layers of cartons on a second pallet if no light cartons are available for loading after reordering and the height of cartons on the first pallet is greater than or equal to half of the permissible height.

11. The method of claim 9, further including the step of building walls of light cartons if no heavy cartons are available to the robot for loading after said reordering step and the height of cartons on the pallet is less than half of the permissible height.

12. The method of claim 9 wherein each of said building layers steps comprises the steps of:

storing a set of partition plans in processor memory;

selecting the best partition plan for the current layer according to such factors as levelness and cube efficiency;

testing each partition plan as each new carton is presented, and replacing the selected partition plan with a new partition plan if the new partition plan has become better according to the factors, factoring in the cartons already loaded onto said pallet, and further loading cartons onto said pallet according to said best partition plan.

* * * * *